US006751586B1

(12) United States Patent
Okuno

(10) Patent No.: US 6,751,586 B1
(45) Date of Patent: Jun. 15, 2004

(54) AUDIO DECODING DEVICE WITH SOFT DECISION ERROR CORRECTION BY BIT INTERPOLATION

(75) Inventor: Daisuke Okuno, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 834 days.

(21) Appl. No.: 09/631,584

(22) Filed: Aug. 3, 2000

(30) Foreign Application Priority Data

Aug. 5, 1999 (JP) .......................................... 11-222196

(51) Int. Cl.⁷ ............................................ H03M 13/03
(52) U.S. Cl. ....................... 704/228; 704/229; 704/230; 714/794
(58) Field of Search ................................ 704/226–230; 714/794, 795; 375/340, 341

(56) References Cited

U.S. PATENT DOCUMENTS

| 4,167,701 | A | * | 9/1979 | Kuki et al. | ................. | 714/780 |
| 4,224,689 | A | * | 9/1980 | Sundberg | ................. | 714/709 |
| 4,710,960 | A | * | 12/1987 | Sato | ................. | 704/219 |
| 4,907,277 | A | * | 3/1990 | Callens et al. | ................. | 704/202 |
| 5,790,595 | A | * | 8/1998 | Benthin et al. | ................. | 375/224 |
| 5,983,174 | A | | 11/1999 | Wong et al. | ................. | 704/228 |
| 6,185,526 | B1 | | 2/2001 | Kato et al. | ................. | 704/228 |
| 6,272,660 | B1 | * | 8/2001 | Chen et al. | ................. | 714/794 |

FOREIGN PATENT DOCUMENTS

| EP | 0 844 741 A2 | 5/1998 | ................. | 714/780 |
| EP | 0 893 791 A2 | 1/1999 | ................. | 704/226 |
| JP | 4-100422 | 2/1992 | ........... | H04B/14/04 |
| JP | 04 100422 | 4/1992 | ........... | H04B/14/04 |

OTHER PUBLICATIONS

W.C. Wong, N. Seshadri and C.–E.W. Sundberg, "Estimation of Unreliable Packets in Subband Coding of Speech", IEE Proceedings I. Solid–State & Electron Devices, Institution of Electrical Engineers, Stevenage, GB, Feb. 1991, pp. 43–49.

* cited by examiner

Primary Examiner—Richemond Dorvil
Assistant Examiner—Donald L. Storm
(74) Attorney, Agent, or Firm—Pearne & Gordon LLP

(57) ABSTRACT

A audio decoding device includes an error correction processing means 13 for generating interpolation process information, a soft decision information generating means 12a for generating a soft decision information indicating a current situation of the transmission line based on coded data, a audio decoding processing means 14 for applying an interpolation process to the audio code in unit of bit based on interpolation information and soft decision information and then decoding the audio code which is subjected to the interpolation process to generate audio data, and a audio output processing means 15 for outputting the audio data.

19 Claims, 13 Drawing Sheets

2A: MOBILE RADIO STATION

AUDIO DECODING DEVICE WITH SOFT DECISION ERROR CORRECTION BY BIT INTERPOLATION

BACKGROUND OF THE INVENTION

The present invention relates to a audio decoding device which is employed in a radio communication system such as a digital audio communication, a audio packet transmission, etc.

Then, a radio communication system to which the audio decoding device in the prior art is applied and which is employed in a normal digital audio communication, etc. will be explained hereunder. FIG. 10 is a block diagram showing a schematic configuration of a normal radio communication system.

As shown in FIG. 10, a radio communication system 1A comprises a plurality of mobile radio stations 2A and base radio stations 3A which relay and connect mutually these mobile radio stations 2A. A audio coding device which codes the input audio and then outputs a transmission signal and a audio decoding device which decodes an incoming received signal and then outputs the audio are built in each of these mobile radio stations 2A and base radio stations 3A.

FIG. 11 is a block diagram showing a schematic configuration of an interior of the audio coding device which corresponds to the audio decoding device in the prior art.

The audio coding device 8 shown in FIG. 11 comprises a audio input processing means 81 for digitally converting the input audio and then outputting the digital signal as audio data; a audio code processing means 82 for coding the audio data which are output from the audio input processing means 81 and then outputting the audio code; a transmission line code processing means 83 for calculating coded data to which redundancy is added to enable the conversion to the audio code once again even if an error is added to the audio code on the transmission line to some extent; a modulation processing means 84 for applying a modulation process to the coded data to output the transmission signal; and a transmission processing means 85 for transmitting the transmission signal which is modulated by the modulation processing means 84 onto the transmission line.

Then, the audio decoding device which has a function for receiving the transmission signal from the transmission processing means 85 in the audio coding device 8 via the transmission line and then decoding the received signal to output the audio will be explained hereunder.

In the prior art, as such audio decoding device, for example, a device set forth in Patent Application Publication (KOKAI) Hei 4-100422 has been known. FIG. 12 is a block diagram showing a schematic configuration of an interior of the audio decoding device in the prior art.

The audio decoding device 100 shown in FIG. 12 comprises a demodulation processing means 101 for receiving the signal, to which the error may be added over the transmission line, as the received signal and then demodulating the received signal into the coded data; an error correction processing means 102 for deciding whether or not the error is added to the coded data, then deciding whether or not the error is correctable if the error is added, then applying an error correction process to the coded data if the error is not added or if the added error is correctable, and then decoding the audio code to generate audio data; a audio decoding means 103 for decoding the audio code to generate the audio data; and a audio output processing means 104 for outputting the audio data which are output from the audio decoding means 103.

The error correction processing means 102 decodes the coded data to generate the audio code if the error is not added to the coded data, then applies the error correction process to the coded data if the error is not added to the coded data and the error is correctable, then decodes the coded data to generate the audio code, and then transmits the generated audio code to the audio decoding means 103 via a switch 105 and stores/holds the generated audio code and the coded data in a buffer 106 frame by frame.

Also, the error correction processing means 102 generates interpolation process information based on the coded data if the error is added to the coded data and the error is uncorrectable, then reads the audio code, which corresponds to the coded data being equivalent to the preceding frame of the coded data, from the buffer 106 without decoding the coded data, and then transmits the read audio code to the audio decoding means 103 via the switch 105 based on the interpolation process information.

In this manner, according to the audio decoding device in the prior art, even in the case that the uncorrectable error is added to the coded data, the interpolation process of the coded data containing the uncorrectable error can be achieved by reading the audio code, which is concerned with the coded data being equivalent to the preceding frame of the coded data containing the uncorrectable error, from the buffer 106 and then transmitting the audio code to the audio decoding means 103.

However, according to the above audio-decoding device in the prior art, in the case that the audio data is generated by decoding the audio code, which is concerned with the coded data containing the uncorrectable error caused due to, for example, aggravating circumstances of the transmission line, as shown in FIG. 13, the audio code which associates with the preceding frame is read from the buffer 106 in unit of frame based on the interpolation process information, in place of decoding of the audio data containing the uncorrectable error (step S101), then the audio code is transmitted to the audio decoding means 103 (step S102), then the interpolation process is executed in unit of frame (step S103), and then the audio code is decoded to generate the audio data (step S104). Therefore, there is a problem that distortion or disconnection of the output audio is generated by carrying out the interpolation process in unit of frame.

SUMMARY OF THE INVENTION

The present invention has been made in light of the above problems, and it is an object of the present invention to provide a audio decoding device which is capable of suppressing generation of the distortion and the disconnection of the output audio to the minimum even when the signal which contains the uncorrectable error caused due to the aggravating circumstances of the transmission line is received.

In order to achieve the above object, a audio decoding device of the present invention comprises a reception processing means for receiving a signal from a transmission line as a received signal; a demodulation processing means for demodulating the received signal which is received by the reception processing means into coded data; a soft decision information generating means for generating a soft decision information indicating a current situation of the transmission line, based on coded data which are demodulated by the demodulation processing means; an error correction processing means for decoding the coded data to output a audio code and also outputting interpolation process information based on the coded data if it is decided that an uncorrectable error is added to the coded data which are demodulated by the demodulation processing means; a audio decoding processing means for reading interpolation information in a preceding frame based on interpolation process information concerning to the audio code, then applying an interpolation process to the audio code in unit of bit based on interpolation information and soft decision information, and then generating audio data by decoding the audio code which is subjected to the interpolation process if the audio code associated with the coded data, to which the uncorrectable error is added, is received from the error correction processing means; and a audio output processing means for outputting the audio data generated by the audio decoding processing means.

Therefore, according to the audio decoding device of the present invention, if the uncorrectable error is caused due to the aggravating circumstances of the transmission line, the interpolation process can be applied to the audio code in unit of bit by using the soft decision information indicating the current situation of the transmission line as well as the interpolation information in decoding, in place of application of the interpolation process to the audio code in unit of frame by using only the interpolation information in the prior art. As a result, while maintaining continuity of a audio waveform in the audio data after the decoding has been completed, generation of distortion and disconnection of the audio can be suppressed to the minimum by providing the optimum interpolation process which can mate with the current situation of the transmission line.

A audio decoding device of the first aspect of the present invention comprises a reception processing means for receiving a signal from a transmission line as a received signal; a demodulation processing means for demodulating the received signal which is received by the reception processing means into coded data; a soft decision information generating means for generating a soft decision information indicating a current situation of the transmission line, based on coded data which are demodulated by the demodulation processing means; an error correction processing means for decoding the coded data to output a audio code and also outputting interpolation process information based on the coded data if it is decided that an uncorrectable error is added to the coded data which are demodulated by the demodulation processing means; a audio decoding processing means for reading interpolation information in a preceding frame based on interpolation process information concerning to the audio code, then applying an interpolation process to the audio code in unit of bit based on interpolation information and soft decision information, and then generating audio data by decoding the audio code which is subjected to the interpolation process if the audio code associated with the coded data, to which the uncorrectable error is added, is received from the error correction processing means; and a audio output processing means for outputting the audio data generated by the audio decoding processing means.

Therefore, according to the audio decoding device of the first aspect of the present invention, there is provided the soft decision information generating means which generates the soft decision information indicating the current situation of the transmission line based on the coded data being demodulated by the demodulation processing means. Even if the audio code which is concerned with the coded data containing the uncorrectable error caused due to the aggravating circumstances of the transmission line is received from the error correction processing means, the interpolation information in the preceding frame can be read based on the interpolation process information concerning to the audio code, then the interpolation process can be applied to the audio code in unit of bit based on the interpolation information and the soft decision information, and then the audio code which is subjected to the interpolation process can be decoded to generate the audio data. As a result, while maintaining continuity of a audio waveform in the audio data after the decoding has been completed, generation of distortion and disconnection of the audio can be suppressed to the minimum by providing the optimum interpolation process which can mate with the current situation of the transmission line.

Preferably, in a audio decoding device as mentioned above, the error correction processing means may stores and holds the audio code and the coded data frame by frame as the interpolation information when the coded data which are demodulated by the demodulation processing means and to which no error is added is decoded to output the audio code, or when an error correction process is applied to the coded data which are demodulated by the demodulation processing means and to which the correctable error is added and then the coded data which are subjected to the error correction process are decoded to output the audio code.

Therefore, according to the audio decoding device, the audio code and the coded data which are generated by decoding the coded data to which no error is added or the coded data to which the correctable error is added are stored and held in unit of frame as the interpolation information. Therefore, continuity of the audio can be assured by applying the optimum interpolation process to the audio code, to which the uncorrectable error is added, based on the interpolation information concerning to the preceding frame.

Preferably, in a audio decoding device, the soft decision information generating means may includes data extracting means for extracting a receiving electric field strength from the coded data which are demodulated by the demodulation processing means, and also extracting phase information of symbol points from the coded data, and soft decision information calculation processing means for generating soft decision information indicating the current situation of the transmission line, based on the receiving electric field strength and the phase information which are extracted by the data extracting means.

Therefore, according to the audio decoding, the receiving electric field strength and the phase information at the symbol points can be extracted from the coded data and then the soft decision information indicating the current situation of the transmission line can be generated based on the receiving electric field strength and the phase information. Therefore, the soft decision information generating means can cope sufficiently with the signal error which is generated due to the aggravating circumstances of the transmission line.

A audio decoding device according to the second aspect of the present invention is characterized by comprising a reception processing means for receiving a signal from a transmission line as a received signal; a demodulation processing means for demodulating the received signal which is received by the reception processing means into coded data; a soft decision information generating means for generating a soft decision information indicating a current situation of the transmission line, based on coded data which are demodulated by the demodulation processing means; an error correction processing means for decoding the coded data demodulated by the demodulation processing means to output a audio code and also outputting interpolation process information concerning to the coded data if it is decided that an uncorrectable error is added to the coded data; an error correction processing situation analyzing means for analyzing an error added situation of the audio code which is output from the error correction processing means; an optimization audio decoding processing means for selecting an optimum audio decoding means, based on an analyzed result obtained by the error correction processing situation analyzing means, out of a normal process type audio decoding means which decodes the audio code output from the error correction processing means to generate the audio data, an interpolation process type audio decoding means which applies the interpolation process to the audio code output from the error correction processing means in unit of bit based on the interpolation process information and the soft decision information and then decodes the audio code which is subjected to the interpolation process to generate the audio data, and an optimization process type audio decoding means which applies an optimizing process to the audio code output from the error correction processing means and then decodes the audio code which is subjected to the optimizing process to generate the audio data, and then outputting the audio data generated by a selected audio decoding means; and a audio output processing means for outputting the audio data generated by the audio decoding processing means.

Therefore, according to the audio decoding, there is provided the soft decision information generating means which generates the soft decision information indicating the current situation of the transmission line based on the coded data demodulated by the demodulation processing means. If the audio code which is concerned with the coded data containing the uncorrectable error caused due to the aggravating circumstances of the transmission line is received from the error correction processing means, the interpolation process can be applied to the audio code, which is output from the error correction processing means, in unit of bit based on the interpolation information and the soft decision information, and then the audio code which is subjected to the interpolation process can be decoded to generate the audio data. As a result, while maintaining continuity of a audio waveform in the audio data after the decoding has been completed, generation of distortion and disconnection of the audio can be suppressed to the minimum by providing the optimum interpolation process which can mate with the current situation of the transmission line.

Therefore, according to the audio decoding device of the second aspect of the present invention, the optimum audio decoding means out of the normal process type audio decoding means, the interpolation process type audio decoding means, and the optimization process type audio decoding means in the optimization audio decoding processing means can be selected based on the analyzed result obtained by the error correction processing situation analyzing means which analyzes the error added situation in the audio code which is output from the error correction processing means. As a result, the optimum audio decoding process which corresponds to the current error added situation can be provided.

Preferably, in a audio decoding device as described above, the soft decision information generating means may includes a data extracting means for extracting a receiving electric field strength from the coded data which are demodulated by the demodulation processing means, and also extracting phase information of symbol points from the coded data, and a soft decision information calculation processing means for generating soft decision information indicating the current situation of the transmission line, based on the receiving electric field strength and the phase information which are extracted by the data extracting means.

Therefore, according to the audio decoding device, the receiving electric field strength and the phase information at the symbol points can be extracted from the coded data and then the soft decision information indicating the current situation of the transmission line can be generated based on the receiving electric field strength and the phase information. Therefore, the soft decision information generating means $22a$ can cope sufficiently with the signal error which is generated due to the aggravating circumstances of the transmission line.

Preferably, in a audio decoding device, the error correction processing means may include an error correction demodulation processing means for applying the error correction process to the coded data which are demodulated by the demodulation processing means bit by bit based on the soft decision information which is generated by the soft decision information generating means, and then decoding the coded data which are subjected to the error correction process to output the audio code.

Therefore, according to the audio decoding device, the error correction process can be applied to the coded data, which are demodulated by the demodulation processing means, bit by bit based on the soft decision information prior to the process in the optimization audio decoding processing means. Therefore, the frequency of the interpolation process in the optimization audio decoding processing means can be reduced.

Preferably, in a audio decoding device, the error correction processing means may include an error check bit calculating means for checking whether or not the error is added to the audio code output from the error correction decoding processing means, and then outputting a checked result as an error check bit.

Therefore, according to the audio decoding device, it is possible to output the error check bit indicating the checked result to show whether or not the error is added to the audio code. Therefore, the processing efficiency in the succeeding error correction processing situation analyzing means which analyzes the error added situation can be improved.

In a audio decoding device, the error correction processing situation analyzing means includes a audio code error deciding means for deciding whether or not the error is added to the audio code which is output from the error correction processing means, based on the error check bit supplied from error check bit calculating means.

Therefore, it can be decided, based on the error check bit, whether or not the error is added to the audio code which is output from the error correction processing means.

Preferably, in a audio decoding device, the optimization audio decoding processing means may includes a audio decoding process storing means for storing sequentially contents of the audio decoding process, which are concerned with a selected audio decoding means, into a audio decoding process storage buffer every frame of the audio data when the audio data which are generated by the selected audio decoding means are output.

Therefore, according to the audio decoding device, the contents of the audio decoding process which is concerned with the selected audio decoding means every frame of the audio data are stored sequentially into the audio decoding process storage buffer when the audio data which is generated by the selected audio decoding means in the optimization audio decoding processing means are output. Therefore, the audio decoding process storing means can recognize by which audio decoding means the audio decoding process is applied frame by frame, and also can use effectively the contents of the audio decoding process in every frame in the succeeding interpolation process.

Preferably, in a audio decoding, the error correction processing situation analyzing means includes an error correctability deciding means for deciding whether or not the error which is added to the audio code is correctable, based on contents of the audio decoding process associated with the audio decoding means which is selected by a preceding frame stored in a audio decoding process storage buffer, if it is decided by the audio code error deciding means that the error is added to the audio code.

Therefore, according to the audio decoding device, it can be decided whether or not the error which is added to the audio code is correctable, based on the contents of the audio decoding process which is concerned with the optimum audio decoding means selected by the preceding frame stored in the audio decoding processing storage buffer.

Preferably, in a audio decoding device, the optimization audio decoding processing means selects the normal process type audio decoding means if it is decided by the audio code error deciding means that no error is added to the audio code, and the selected normal process type audio decoding means decodes the audio code which is output from the error correction processing means to generate the audio data.

Therefore, according to the audio decoding device, if it decided by the audio code error deciding means that the error is not added to the audio code, the audio code error deciding means selects the normal process type audio decoding means to execute the normal audio decoding process. Therefore, the optimum audio decoding process to correspond to the current error added situation can be provided.

Preferably, in a audio decoding device, the optimization audio decoding processing means includes a audio information storage means for storing sequentially the audio data and the audio code into a audio information storage buffer every frame when the audio data which are generated by the selected audio decoding means are output.

Therefore, according to the audio decoding device, the audio data and the audio code are stored sequentially into the audio information storage buffer every frame when the audio data generated by the selected audio decoding means are output. Therefore, the audio information storing means can recognize the audio data and the audio code frame by frame and also can use effectively the audio data and the audio code in every frame in the succeeding interpolation process.

Preferably, in a audio decoding device, the optimization audio decoding processing means selects the interpolation process type audio decoding means if it is decided by an error correctability deciding means that the error which is added to the audio code is uncorrectable, and the selected interpolation process type audio decoding means reads the audio data and the audio code, which are stored in the audio information storage buffer and are concerned with the preceding frame, as the interpolation information based on the interpolation process information concerning to the audio code, then applies the interpolation process to the audio code to which the uncorrectable error is added in unit of bit based on the interpolation information and the soft decision information, and then decodes the audio code which is subjected to the interpolation process to generate the audio data, if the audio code which is output from the error correction processing means and to which the uncorrectable error is added is received.

Therefore, according to the audio decoding, the error correctability deciding means can select the interpolation process type audio decoding means to execute the audio decoding process together with the interpolation process if it decides that the error being added to the audio code is uncorrectable. Therefore, the optimum audio decoding process to correspond to the current error added situation can be provided.

Preferably, in a audio decoding device, the optimization audio decoding processing means selects the optimization process type audio decoding means if it is decided by the error correctability deciding means that the error which is added to the audio code is correctable, and the selected optimization process type audio decoding means applies an optimizing process to the audio code which is output from the error correction processing means, and then decodes the audio code which is subjected to the optimizing process to generate the audio data.

Therefore, according to the audio decoding device, the error correctability deciding means can select the optimization process type audio decoding means to execute the audio decoding process together with the optimization process if it decides that the error being added to the audio code is correctable. Therefore, the optimum audio decoding process to correspond to the current error added situation can be provided.

Preferably, in a audio decoding device, the optimization process type audio decoding means includes an optimizing normal process type audio decoding means for decoding the audio code to generate the audio data if it is decided by the error correctability deciding means that the error which is added to the audio code is correctable.

Therefore, according to the audio decoding device, if it is decided by the error correctability deciding means that the error which is added to the audio code is correctable, the audio data can be generated by decoding the audio code.

Preferably, in a audio decoding device, the optimization process type audio decoding means may includes a audio decision processing means for calculating a correlation value between the audio data generated by the optimizing normal process type audio decoding means and the audio data in the preceding frame stored in the audio information storage buffer, then deciding whether or not a calculated correlation value is in excess of a threshold value, and the optimization process type audio decoding means sets the audio data generated by the optimizing normal process type audio decoding means as the audio data generated in the optimization process type audio decoding means if it is decided by the audio decision processing means that the calculated correlation value exceeds the threshold value.

Therefore, according to the audio decoding device, if it is decided by the audio decision processing means that the correlation value is in excess of the threshold value, the audio decision processing means decides the audio data as the audio, and then sets the audio data generated by the optimizing normal process type audio decoding means as the audio data generated in the optimization process type audio decoding means.

Preferably, in a audio decoding device, the optimization process type audio decoding means includes an interpolation process deciding means for counting sequentially a number of times of the audio decoding process frame by frame by using the optimizing normal process type audio decoding means, and then deciding whether or not the number of times of the audio decoding process exceeds a predetermined number of times if it is decided by the audio decision processing means that the correlation value is not in excess of the threshold value, and an optimizing interpolation process type audio decoding means for applying the interpolation process to the audio code being output from the error correction processing means bit by bit based on the soft decision information and the audio code concerning to the preceding frame which is stored in the audio information storage buffer, then decoding the audio code which is subjected to the interpolation process to generate the audio data, and then setting such audio data as the audio data generated in the optimization process type audio decoding means if it is decided by the interpolation process deciding means that the number of times of the audio decoding process in every frame exceeds the predetermined number of times.

Therefore, according to the audio decoding device, if it is decided by the audio decision processing means that the correlation value does not exceed the threshold value, the interpolation process deciding means decides that the audio data is not the audio, then decides that the number of times of the audio decoding process exceeds the predetermined number of times, and then shifts the process to the audio decoding process in the optimizing interpolation process type audio decoding means if it is decided that the number of times of the audio decoding process exceeds the predetermined number of times. Therefore, prior to the audio decoding process in the optimizing interpolation process type audio decoding means, the audio codes can be estimated as much as possible and also the interpolation process executed by the optimizing interpolation process type audio decoding means is applied only to the audio codes which cannot be estimated, so that the frequency of the interpolation process can be reduced as small as possible and thus generation of the distortion and disconnection of the audio can be suppressed to the minimum while maintaining continuity of the audio waveform.

Preferably, in a audio decoding device, the optimization process type audio decoding means includes a audio code optimization processing means for detecting likelihood of respective elements of the audio code which is output from the error correction processing means based on the soft decision information, then applying bit inversion to low likelihood elements of the audio code, and then generating the audio code which is subjected to the bit inversion, if it is decided by the interpolation process deciding means that the number of times of the audio decoding process in every frame does not exceed the predetermined number of times, and the optimizing normal process type audio decoding means decodes the audio code which is generated by the audio code optimization processing means and which is subjected to the bit inversion to generate the audio data.

Therefore, according to the audio decoding, if it is decided by the interpolation process deciding means that the number of times of the audio decoding process in every frame does not exceed the predetermined number of times, the audio code optimization processing means detects likelihood of respective elements of the audio code being output by the error correction processing means based on the soft decision information, then applies the bit inversion to the low likelihood elements of the audio code, and then decodes the audio code which is subjected to the bit inversion by the optimizing normal process type audio decoding means. Therefore, prior to the audio decoding process in the optimizing interpolation process type audio decoding means, the audio codes can be estimated as much as possible and also the interpolation process executed by the optimizing interpolation process type audio decoding means is applied only to the audio codes which cannot be estimated, so that the frequency of the interpolation process can be reduced as small as possible and thus generation of the distortion and disconnection of the audio can be suppressed to the minimum while maintaining continuity of the audio waveform.

DETAILED DESCRIPTION OF THE PREFERRED EMBODIMENTS

A sound decoding apparatus according to the present invention will be explained in detail with reference to the accompanying drawings hereinafter.

Embodiment 1

Figure 1:
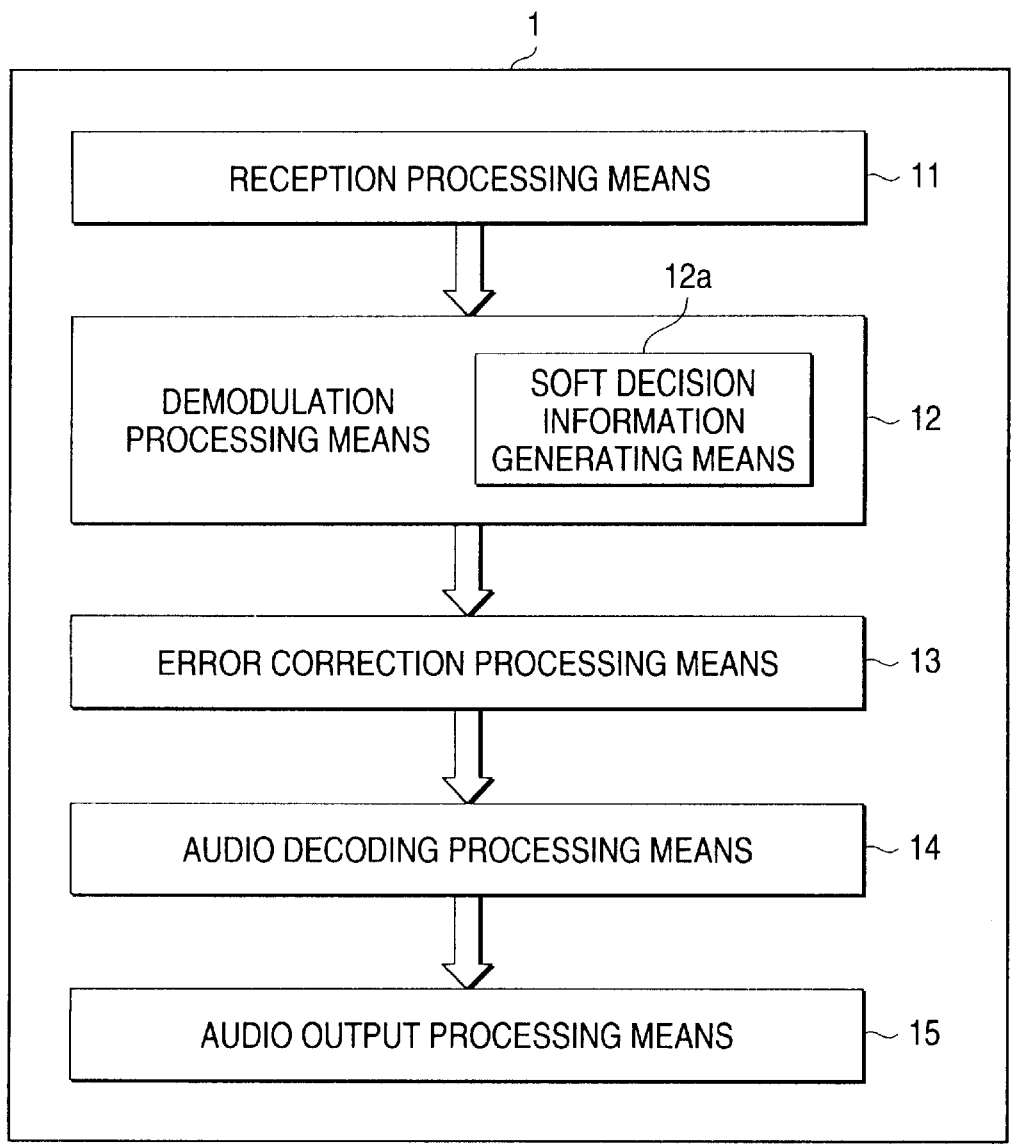
FIG. 1 is a block diagram showing a schematic configuration of an interior of a audio decoding device according to a first embodiment of the present invention.

At first, a sound decoding apparatus according to a first embodiment will be explained hereinbelow. FIG. 1 is a block diagram showing a schematic configuration of an interior of the audio decoding device according to the first embodiment.

The audio decoding device 1 shown in FIG. 1 is incorporated into the foregoing radio communication system, and has a function for receiving the transmission signal from the audio coding device incorporated into the radio communication system as the received signal via the transmission line and then decoding the received signal to output the audio.

The audio decoding device 1 shown in FIG. 1 comprises a reception processing means 11, a demodulation processing means 12, a soft decision information generating means 12a, an error correction processing means 13, a audio decoding processing means 14, and a audio output processing means 15.

The reception processing means 11 receives the signal, which has such a possibility that the error is added on the transmission line, as the received signal from the audio coding device 8.

The demodulation processing means 12 decodes the received signal received by the reception processing means 11 into coded data.

The soft decision information generating means 12a extracts a receiving electric field strength from the coded data, which are demodulated by the demodulation processing means 12, and also extracts phase information of symbol points from the coded data, and then generates soft decision information indicating the current situation of the transmission line, based on the extracted receiving electric field strength and the extracted phase information.

If it is decided that no error is added to the coded data demodulated by the demodulation processing means 12, the error correction processing means 13 decodes the coded data to output the audio code. Also, if it is decided that the correctable error is added to the coded data which are demodulated by the demodulation processing means 12, the error correction processing means 13 applies the error correction process to the coded data and also decodes the coded data, which is subjected to the error correction process, to output the audio code. In addition, if it is decided that the uncorrectable error is added to the coded data which are demodulated by the demodulation processing means 12, the error correction processing means 13 decodes the coded data to output the audio code and then outputs interpolation process information based on the coded data.

If the audio decoding processing means 14 receives the audio code associated with the coded data to which no error is added, or the audio code associated with the coded data to which the correctable error is added from the error correction processing means 13, such audio decoding processing means 14 decodes the audio code to output the audio data. Also, if the audio decoding processing means 14 receives the audio code associated with the coded data to which the uncorrectable error is added from the error correction processing means 13, such audio decoding processing means 14 reads the interpolation information in the preceding frame based on the interpolation process information concerning to the audio code, then applies the interpolation process to the audio code bit by bit based on the interpolation information and the soft decision information, and then decodes the audio code which is subjected to the interpolation process to generate the audio data.

The audio output processing means 15 outputs the audio data which are generated by the audio decoding processing means 14.

Also, the error correction processing means 13 serves to store/hold the audio code and the coded data frame by frame as the interpolation information when the coded data which are demodulated by the demodulation processing means 12 and to which no error is added is decoded to then output the audio code, or when the error correction process is applied to the coded data which are demodulated by the demodulation processing means 12 and to which the correctable error is added and then the coded data which are subjected to the error correction process are decoded to then output the audio code.

Next, an operation of the audio decoding device 1 according to the first embodiment will be explained hereunder.

When the reception processing means 11 receives the signal which has such a possibility that the error is added on the transmission line as the received signal, it transmits the received signal to the demodulation processing means 12. The demodulation processing means 12 then demodulates the received signal received by the reception processing means 11 into the coded data, and then transmits the coded data to the error correction processing means 13.

The soft decision information generating means 12a generates the soft decision information indicating the current situation of the transmission line, based on the coded data which are demodulated by the demodulation processing means 12.

The soft decision information generating means 12a extracts the receiving electric field strength and the phase information of symbol points from the coded data which are demodulated by the demodulation processing means 12, and then generates the soft decision information indicating the current situation of the transmission line while using a level of the receiving electric field strength, an amount of the phase shift of the symbol points, etc. as parameters. For example, if the level of the receiving electric field strength is low, if the level of the receiving electric field strength is varied, if the amount of the phase shift of the symbol points is increased, or the like, the soft decision information generating means 12a generates the soft decision information indicating that the situation of the transmission line becomes worse.

If it is decided that no error is added to the coded data which are demodulated by the demodulation processing means 12, the error correction processing means 13 decodes the coded data to transmit the audio code to the audio decoding processing means 14.

Also, if it is decided that the correctable error is added to the coded data which are demodulated by the demodulation processing means 12, the error correction processing means 13 applies the error correction process to the coded data, and then decodes the coded data which are subjected to the error correction process to then transmit the audio code to the audio decoding processing means 14.

Also, if it is decided that the uncorrectable error is added to the coded data which are demodulated by the demodulation processing means 12, the error correction processing means 13 decodes the coded data to output the audio code and also transmits the interpolation process information to the audio decoding processing means 14 based on the coded data.

When the audio decoding processing means 14 receives the audio code associated with the coded data to which no error is added, or the audio code associated with the coded data to which the correctable error is added from the error correction processing means 13, such audio decoding processing means 14 decodes the audio code to generate the audio data, and then transmits such audio data to the audio output processing means 15.

Also, when the audio decoding processing means 14 receives the audio code associated with the coded data to which the uncorrectable error is added from the error correction processing means 13, such audio decoding processing means 14 reads the interpolation information in the preceding frame based on the interpolation process information concerning to the audio code, then applies the interpolation process to the audio code bit by bit based on the interpolation information and the soft decision information, then decodes the audio code which is subjected to the interpolation process to generate the audio data, and then transmits the audio data to the audio output processing means 15.

The audio output processing means 15 outputs the audio data which are generated by the audio decoding processing means 14.

Figure 2:
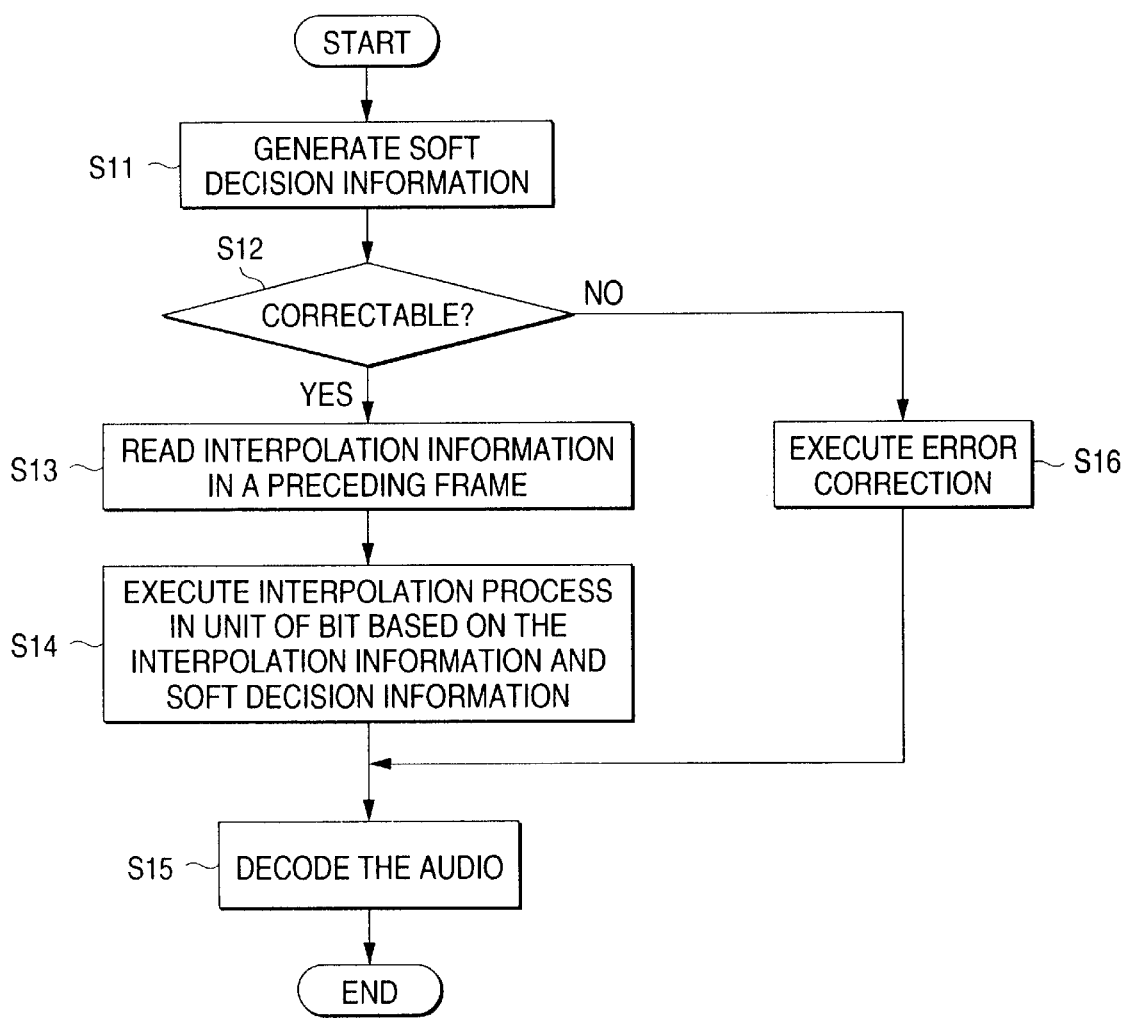
FIG. 2 is a flowchart showing a processing operation carried out in the interior of the audio decoding device according to the first embodiment of the present invention.

In other words, according to the audio decoding device, as shown in FIG. 2, the soft decision information indicating the current situation of the transmission line is generated by the soft decision information generating means 12a (step S11). It is decided whether or not the audio code which is concerned with the coded data to which the uncorrectable error is added is received (step S12).

If the audio code which is concerned with the coded data to which the uncorrectable error is added is received, the interpolation information in the preceding frame is read based on the interpolation process information concerning to the audio code (step S13). The interpolation process is applied to the audio code in unit of bit based on the interpolation information and the soft decision information (step S14). The audio code which is subjected to the interpolation process is decoded to generate the audio data (step S15).

While, in step S12, if the audio code which is concerned with the coded data to which the correctable error is added is received, the error correction is executed. Then, the process goes to step S15.

According to the audio decoding device 1 in the first embodiment, there is provided the soft decision information generating means 12a which generates the soft decision information indicating the current situation of the transmission line based on the coded data demodulated by the demodulation processing means 12. Even if the audio code which is concerned with the coded data containing the uncorrectable error caused due to the aggravating circumstances of the transmission line is received, the interpolation information in the preceding frame can be read based on the interpolation process information concerning to the audio code, then the interpolation process can be applied to the audio code in unit of bit based on the interpolation information and the soft decision information, and then the audio code which is subjected to the interpolation process can be decoded to generate the audio data. As a result, while maintaining continuity of a audio waveform in the audio data after the decoding has been completed, generation of distortion and disconnection of the audio can be suppressed to the minimum by providing the optimum interpolation process which can mate with the current situation of the transmission line.

Embodiment 2

Figure 3:
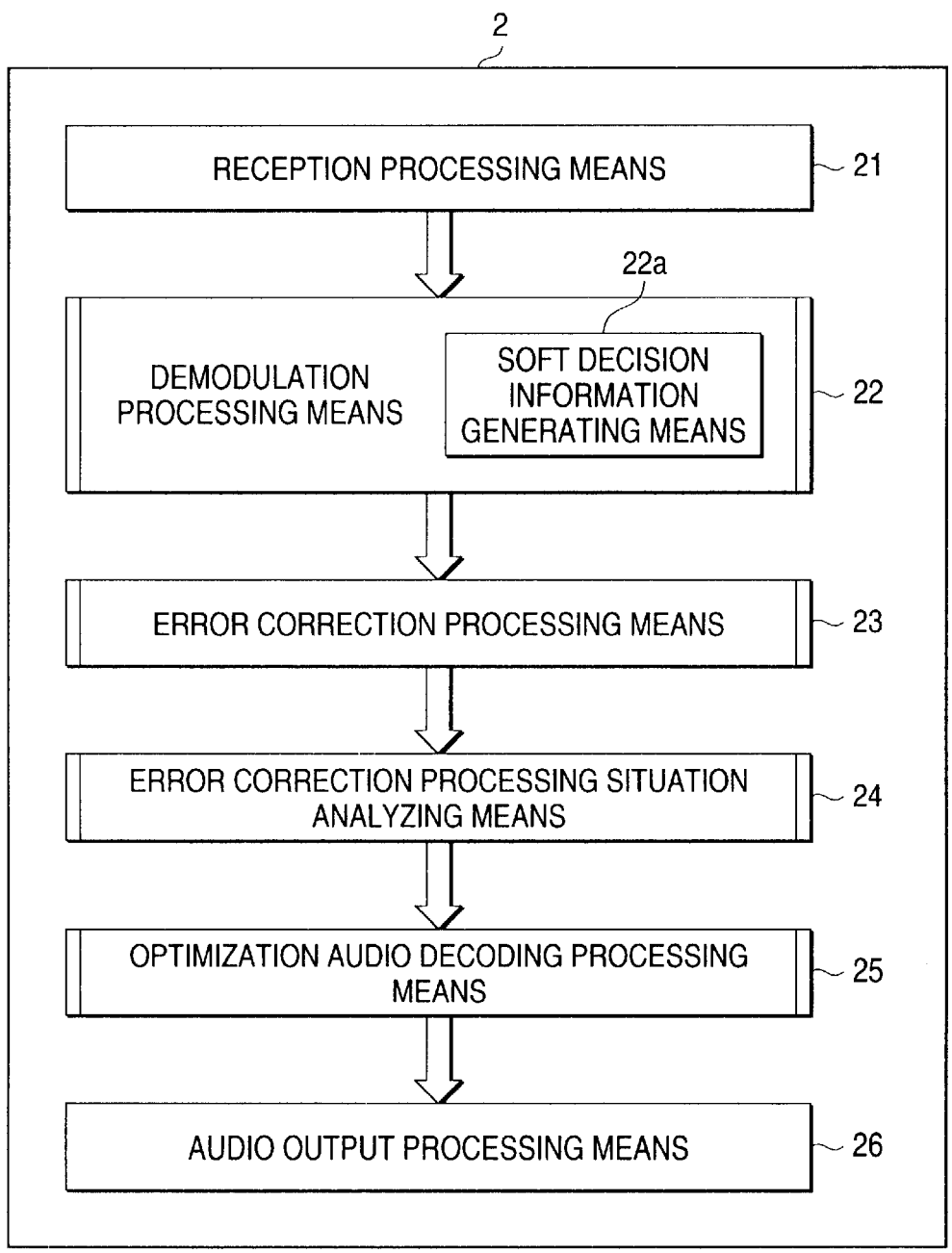
FIG. 3 is a block diagram showing a schematic configuration of an interior of a audio decoding device according to a second embodiment of the present invention.

Then, a audio decoding device according to a second embodiment of the present invention will be explained hereinbelow. FIG. 3 is a block diagram showing a schematic configuration of an interior of the audio decoding device according to the second embodiment.

The audio decoding device shown in FIG. 3 comprises a reception processing means 21, a demodulation processing means 22, a soft decision information generating means 22a to be described, an error correction processing means 23, an error correction processing situation analyzing means 24, an optimization audio decoding processing means 25, and a audio output processing means 26.

The reception processing means 21 receives a signal, which has such a possibility that the error is added on the transmission line, as the received signal.

The demodulation processing means 22 demodulates the received signal, which is received by the reception processing means 21, into coded data.

The soft decision information generating means 22a generates the soft decision information indicating the current situation of the transmission line, based on the coded data which are demodulated by the demodulation processing means 22.

The error correction processing means 23 decodes the coded data which are demodulated by the demodulation processing means 22 to output the audio code, and also outputs the interpolation process information relating to the coded data if it is decided that the uncorrectable error is added to the coded data.

The error correction processing situation analyzing means 24 analyzes the error added situation in the audio code which is output from the error correction processing means 23.

The optimization audio decoding processing means 25 selects an optimum audio decoding means out of a normal process type audio decoding means 63, an optimization process type audio decoding means 65, and an interpolation process type audio decoding means 66 based on the analyzed result obtained by the error correction processing situation analyzing means 24, and then outputs the audio data generated by the selected audio decoding means out of the audio decoding means 63, 65, 66. The normal process type audio decoding means 63 decodes the audio code, which is output from the error correction processing means 23, to generate the audio data. The interpolation process type audio decoding means 66 applies the interpolation process to the audio code, which is output from the error correction processing means 23, in unit of bit based on the interpolation process information and the soft decision information, and then decodes the audio code which is subjected to the interpolation process to generate the audio data. The optimization process type audio decoding means 65 applies an optimizing process to the audio code which is output from the error correction processing means 23, and then decodes the audio code which is subjected to the optimizing process to generate the audio data.

The audio output processing means 26 outputs the audio data which are output from the optimization audio decoding processing means 25.

Figure 4:
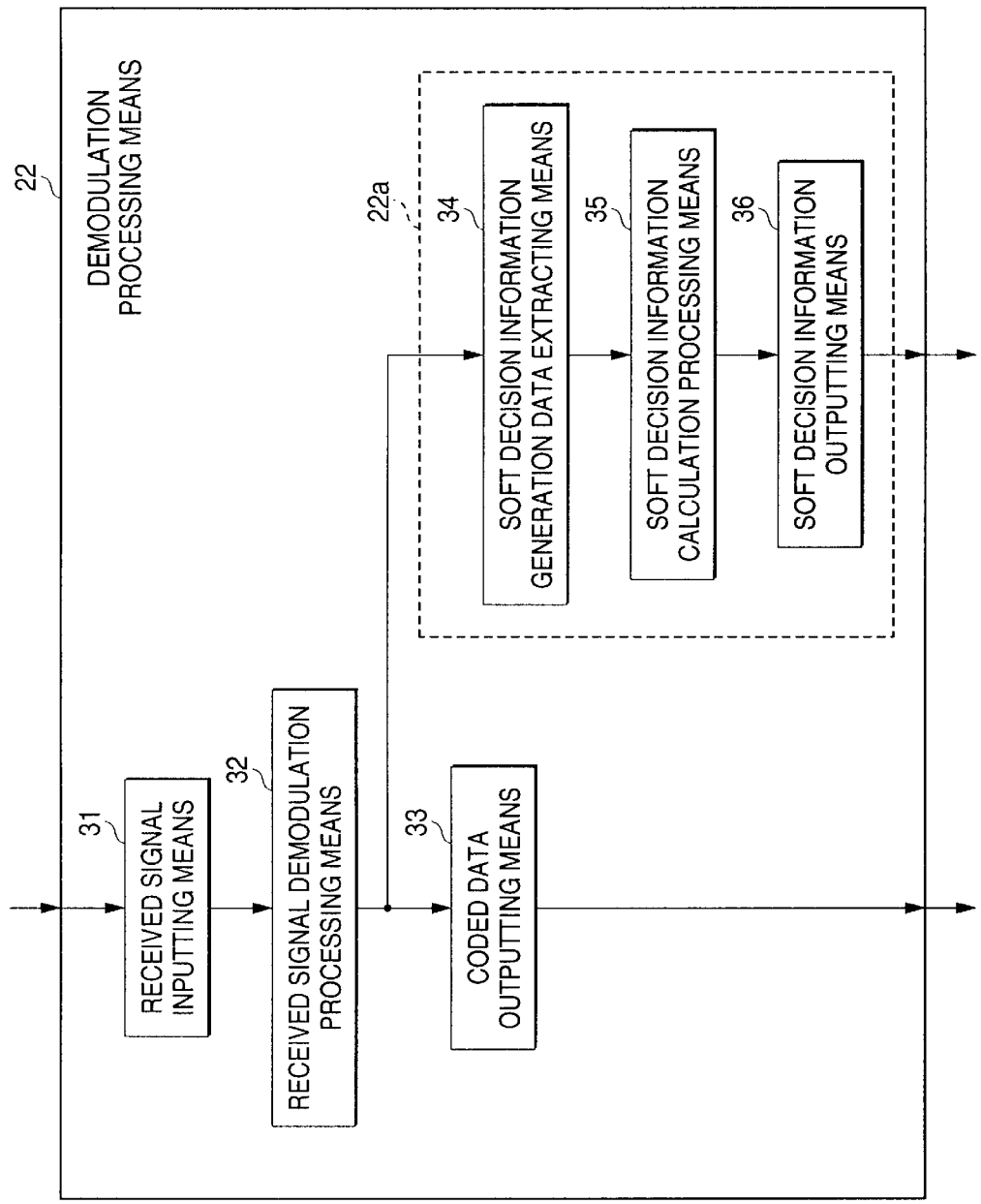
FIG. 4 is a block diagram showing a schematic configuration of an interior of a demodulation processing means of the audio decoding device according to the second embodiment.

Then, a schematic configuration of an interior of the demodulation processing means 22 shown in FIG. 3 will be explained hereunder. FIG. 4 is a block diagram showing the schematic configuration of the interior of the demodulation processing means 22.

The demodulation processing means 22 shown in FIG. 4 comprises a received signal inputting means 31 for inputting the received signal from the reception processing means 21, a received signal demodulation processing means 32 for demodulating the received signal to generate the coded data, a coded data outputting means 33 for transmitting demodulated data to the error correction processing means 23, and the soft decision information generating means 22a described above.

The soft decision information generating means 22a comprises a soft decision information generation data extracting means 34 for extracting the receiving electric field strength from the coded data which are demodulated by the received signal demodulation processing means 32 and also extracting phase information of the symbol points from the coded data; a soft decision information calculation processing means 35 for generating the soft decision information indicating the current situation of the transmission line based on the receiving electric field strength and the phase information which are extracted by the soft decision information generation data extracting means 34; and a soft decision information outputting means 36 for outputting the soft decision information which are generated by the soft decision information calculation processing means 35.

Figure 5:
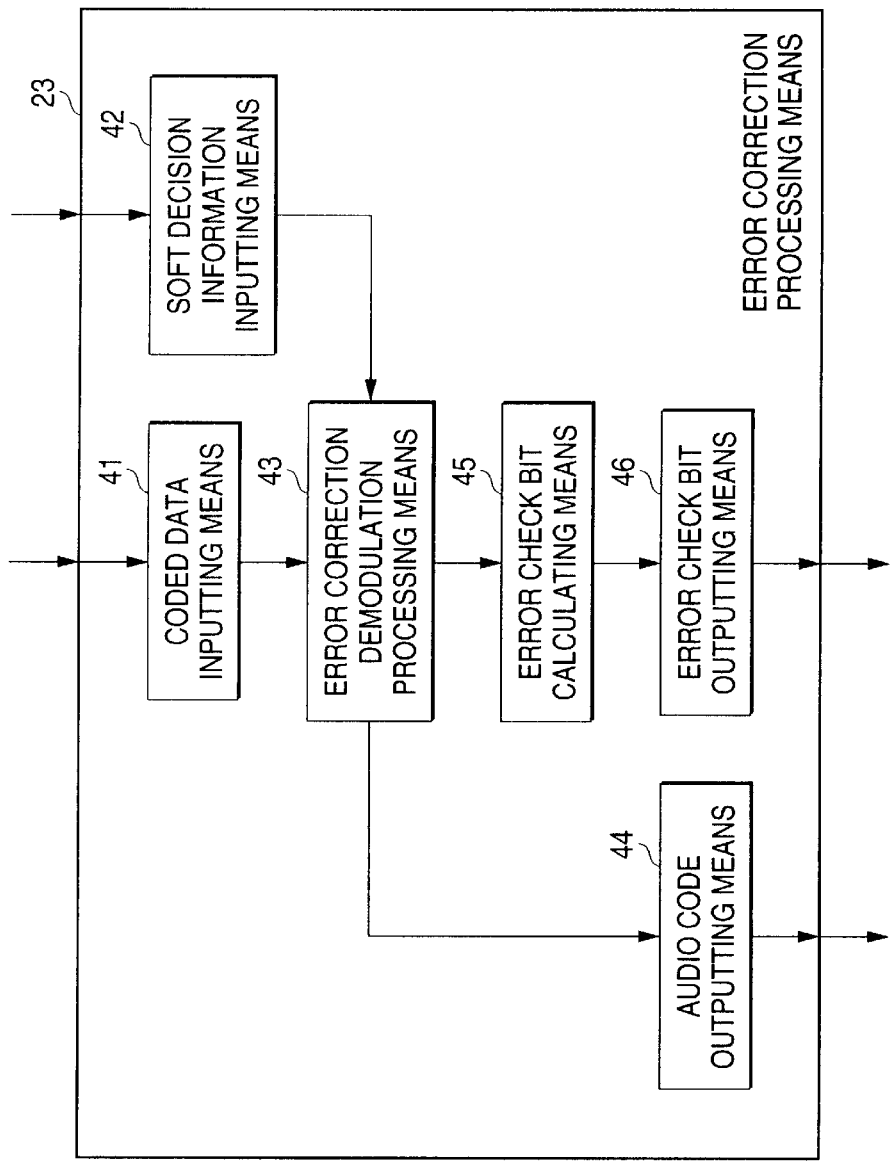
FIG. 5 is a block diagram showing a schematic configuration of an interior of an error correction processing means of the audio decoding device according to the second embodiment.

Then, a schematic configuration of an interior of the error correction processing means 23 shown in FIG. 3 will be explained hereunder. FIG. 5 is a block diagram showing the schematic configuration of the interior of the error correction processing means 2.

The error correction processing means 23 shown in FIG. 5 comprises a coded data inputting means 41 for inputting the coded data from the coded data outputting means 33 in the demodulation processing means 22; a soft decision information inputting means 42 for inputting the soft decision information from the soft decision information outputting means 36 in the soft decision information generating means 22a; an error correction demodulation processing means 43 applies the error correction process to the coded data, which are input by the coded data inputting means 41, bit by bit based on the soft decision information and then decodes the coded data, which are subjected to the error correction process, to output the audio code; a audio 37 code outputting means 44 for outputting the audio code from the error correction demodulation processing means 43; an error check bit calculating means 45 for checking whether or not the error is added to the output audio code and then outputting the checked result as an error check bit; and an error check bit outputting means 46 for outputting the error check bit.

Figure 6:
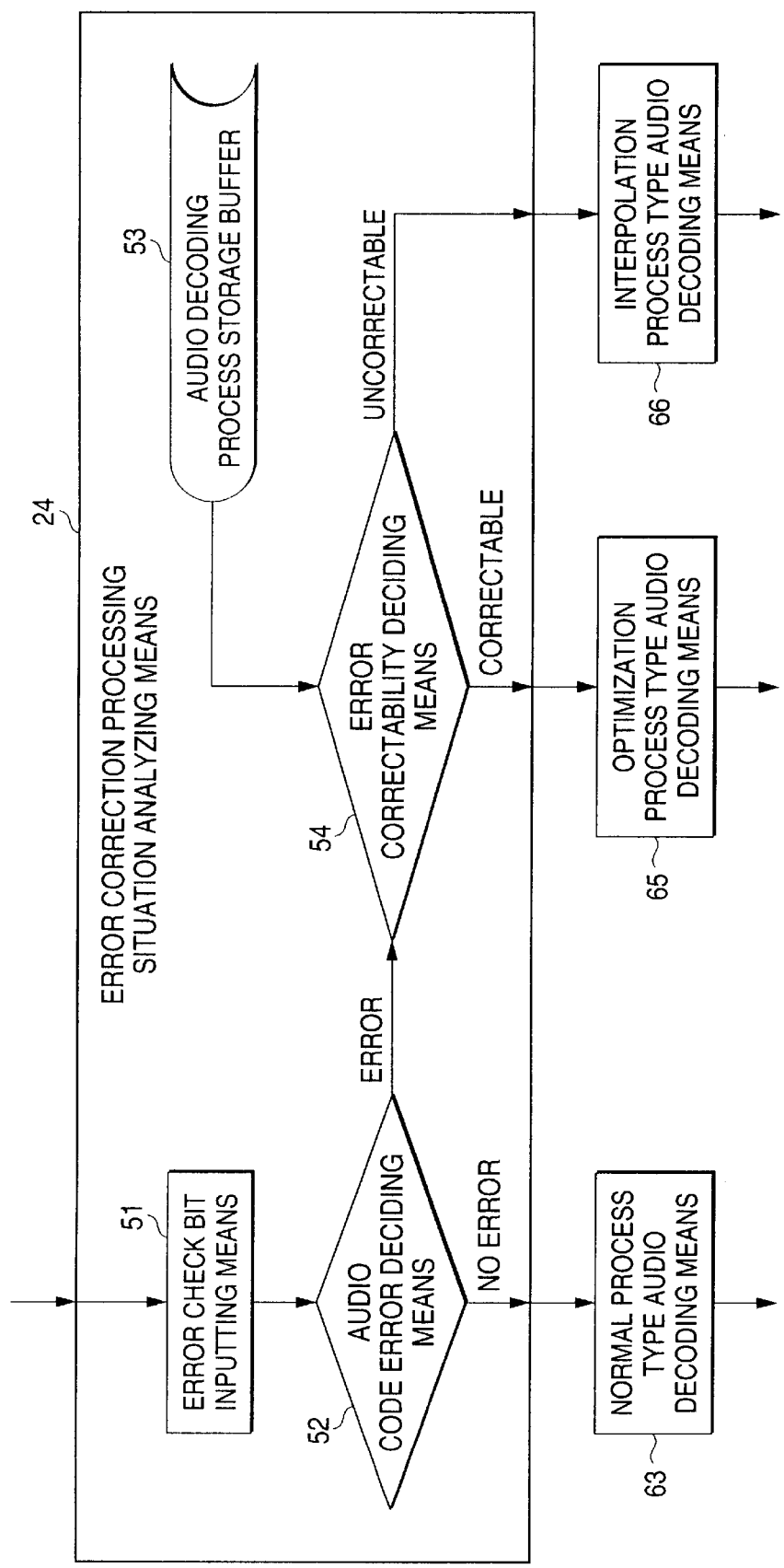
FIG. 6 is a block diagram showing a schematic configuration of an interior of an error correction processing situation analyzing means of the audio decoding device according to the second embodiment.

Then, a schematic configuration of an interior of the error correction processing situation analyzing means 24 shown in FIG. 3 will be explained hereunder. FIG. 6 is a block diagram showing the schematic configuration of the interior of the error correction processing situation analyzing means 24.

The error correction processing situation analyzing means 24 shown in FIG. 6 comprises an error check bit inputting means 51 for analyzing the error added situation of the audio code, the error correction situation in the preceding frame, etc. to effectively decode the audio code into the audio data, and then inputting the error check bit from the error check bit outputting means 46 in the error correction processing means 23; a audio code error deciding means 52 for deciding whether or not the error is added to the audio code which is output from the error correction processing means 23, based on the error check bit; and an error correctability deciding means 54 for deciding whether or not the error added to the audio code is correctable, based on contents of the audio decoding process in connection with the audio decoding means which is selected by the preceding frame stored in a audio decoding process storage buffer 53 described later, if it is decided by the audio code error deciding means 52 that the error is added to the audio code.

Figure 7:
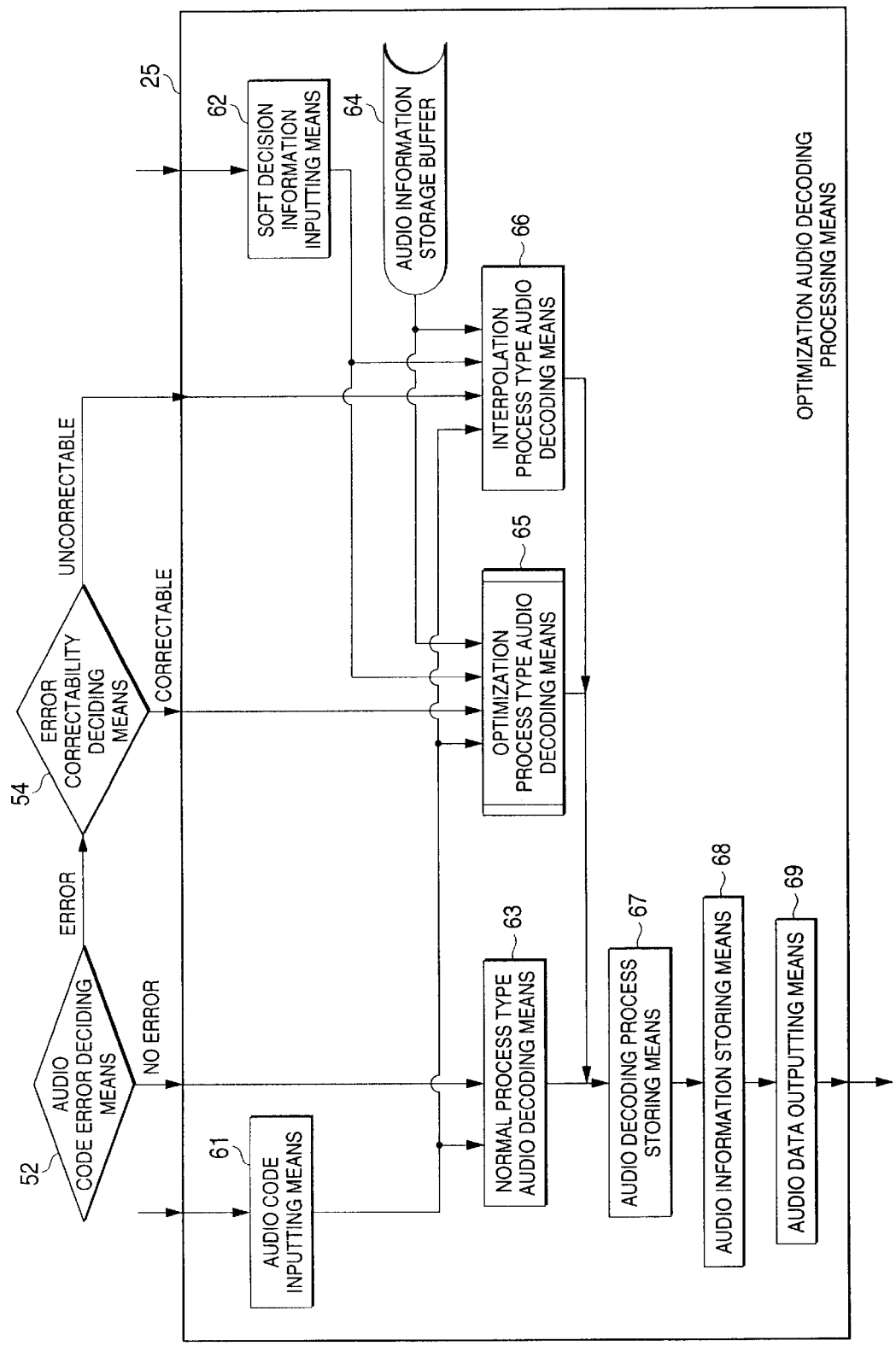
FIG. 7 is a block diagram showing a schematic configuration of an interior of an optimization audio decode processing means of the audio decoding device according to the second embodiment.

Then, a schematic configuration of an interior of the optimization audio decoding processing means 25 shown in FIG. 3 will be explained hereunder. FIG. 7 is a block diagram showing the schematic configuration of the interior of the optimization audio decode processing means 25.

The optimization audio decoding processing means 25 shown in FIG. 7 comprises a audio code inputting means 61 for selecting the optimum audio decoding means out of the audio decoding means 63, 65, 66 based on the analyzed result obtained by the error correction processing situation analyzing means 24, then decoding the audio code while further optimizing the audio code by estimating the audio code with the use of the soft decision information indicating the current situation of the transmission line, as the case may be, and then inputting the audio code from the audio code outputting means 44 in the error correction processing means 23; a soft decision information inputting means 62 for inputting the soft decision information from the soft decision information outputting means 36 in the soft decision information generating means 22a; a normal process type audio decoding means 63; a audio information storage buffer 64; a optimization process type audio decoding means 65; an interpolation process type audio decoding means 66; a audio decoding process storing means 67; a audio information storing means 68; and a audio data outputting means 69.

The audio code inputting means 61 is a portion for inputting the audio code from the audio code outputting means 44 in the error correction processing means 23. The soft decision information inputting means 62 is a portion for inputting the soft decision information from the soft decision information outputting means 36 in the soft decision information generating means 22a.

The normal process type audio decoding means 63 decodes the audio code, which is input from the audio code inputting means 61, to generate the audio data.

The interpolation process type audio decoding means 66 applies the interpolation process to the audio code, which is input from the audio code inputting means 61, bit by bit based on the interpolation process information and the soft decision information, and then decodes the audio code, which is subjected to the interpolation process, to generate the audio data.

The optimization process type audio decoding means 65 applies the optimization process to the audio code, which is input from the audio code inputting means 61, and then decodes the audio code, which is subjected to the optimization process, to generate the audio data.

In this case, the optimization audio decoding processing means 25 selects the optimum audio decoding means 63 (65, 66) out of the normal process type audio decoding means 63, the optimization process type audio decoding means 65, and the interpolation process type audio decoding means 66 based on the analyzed result by the error correction processing situation analyzing means 24, and then outputs the audio data which are generated by the selected audio decoding means 63 (65, 66).

The audio decoding process storing means 67 stores sequentially contents of the audio decoding process, which are concerned with the selected audio decoding means 63 (65, 66), into the audio decoding process storage buffer 53 every frame of the audio data when the audio data which are generated by the selected audio decoding means 63 (65, 66) are output.

The audio information storing means 68 stores sequentially the audio data and the audio code into the audio information storage buffer 64 frame by frame when the audio data which are generated in accordance with the contents of the audio decoding process associated with the selected audio decoding means 63 (65, 66) are output.

The audio data outputting means 69 outputs the audio data which are generated by the selected audio decoding means 63 (65, 66).

Figure 8:
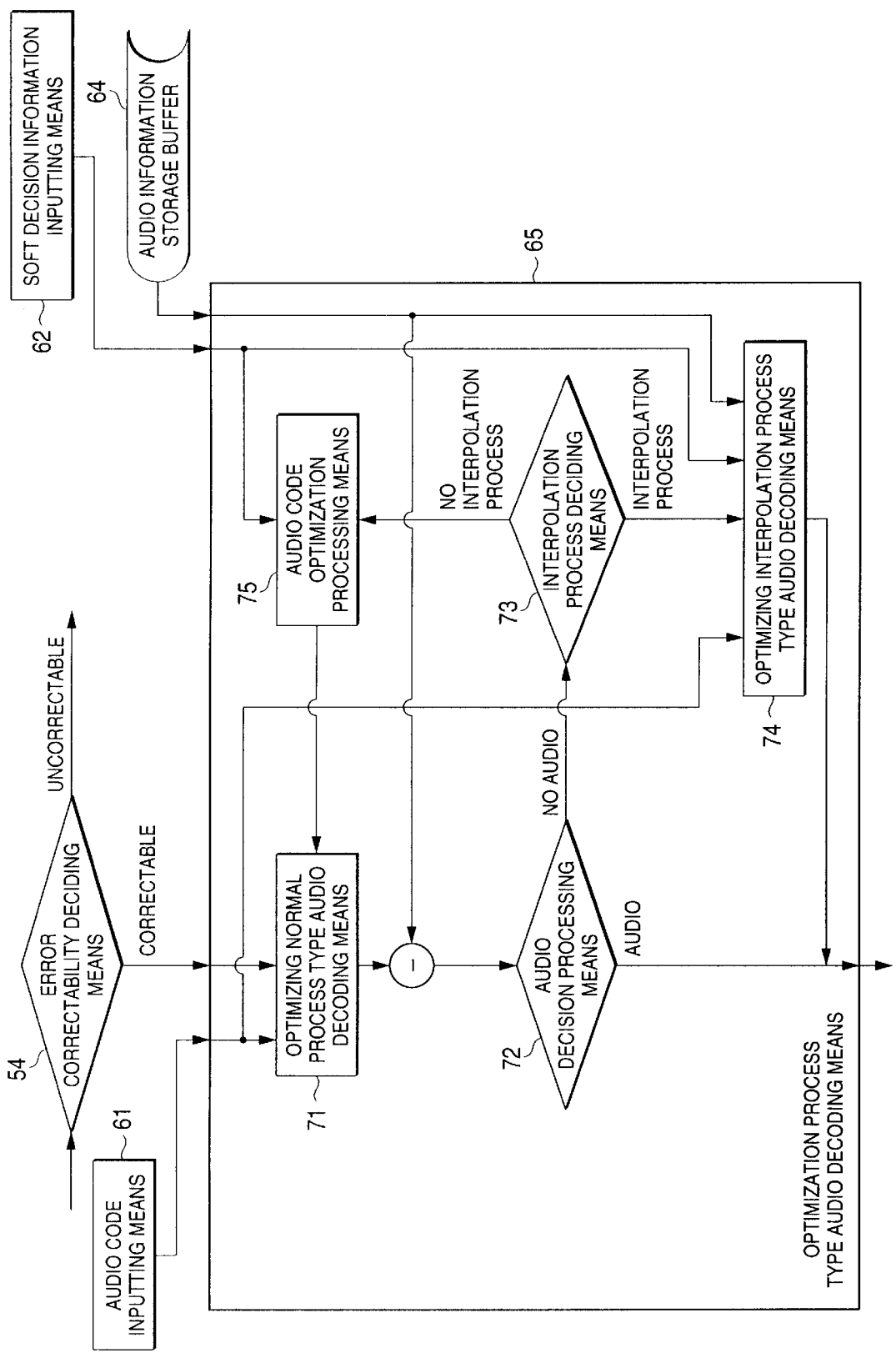
FIG. 8 is a block diagram showing a schematic configuration of an interior of an optimization process type audio decoding means in the optimization audio decode processing means of the audio decoding device according to the second embodiment.

Next, a schematic configuration of an interior of the optimization process type audio decoding means 65 shown in FIG. 7 will be explained hereunder. FIG. 8 is a block diagram showing the schematic configuration of the interior of the optimization process type audio decoding means 65.

The optimization process type audio decoding means 65 shown in FIG. 8 comprises an optimizing normal process type audio decoding means 71, a audio decision processing means 72, an interpolation process deciding means 73, an optimizing interpolation process type audio decoding means 74, and a audio code optimization processing means 75.

The optimizing normal process type audio decoding means 71 decodes the audio code to generate the audio data if it is decided by the error correctability deciding means 54 in the error correction processing situation analyzing means 24 that the error added to the audio code is correctable.

The audio decision processing means 72 calculates a correlation value between the audio data generated by the optimizing normal process type audio decoding means 71 and the audio data in the preceding frame stored in the audio information storage buffer 64, then decides whether or not the calculated correlation value is in excess of a threshold value, and then sets the audio data generated by the optimizing normal process type audio decoding means 71 as the audio data generated in the optimization process type audio decoding means 65 if the calculated correlation value exceeds the threshold value.

If it is decided by the audio decision processing means 72 that the correlation value is not in excess of the threshold value, the interpolation process deciding means 73 counts sequentially the number of times of the audio decoding process frame by frame by using the optimizing normal process type audio decoding means 71, and then decides whether or not the number of times of the audio decoding process exceeds a predetermined number of times.

If it is decided by the interpolation process deciding means 73 that the number of times of the audio decoding process in every frame exceeds the predetermined number of times, the optimizing interpolation process type audio decoding means 74 applies the interpolation process to the audio code from the audio code inputting means 61 based on the soft decision information from the soft decision information inputting means 62 and the audio code relating to the preceding frame which is stored in the audio code inputting means 61, then decodes the audio code which is subjected to the interpolation process to generate the audio data, and then sets such audio data as the audio data generated in the optimization process type audio decoding means 65.

If it is decided by the interpolation process deciding means 73 that the number of times of the audio decoding process in every frame does not exceed the predetermined number of times, the audio code optimization processing means 75 detects likelihood of respective elements of the audio code supplied from the audio code inputting means 61 based on the soft decision information, then applies the bit inversion of the low likelihood elements to the audio code, and then transmits the audio code which is subjected to the bit inversion to the optimizing normal process type audio decoding means 71.

Next, an operation of the audio decoding device 2 according to the second embodiment will be explained hereunder.

First, an overall operation of the audio decoding device 2 will be explained with reference to FIG. 3 hereunder.

The reception processing means 21 transmits the received signal to the demodulation processing means 22 when it receives the signal, which has such a possibility that the error is added on the transmission line, as the received signal.

The demodulation processing means 22 demodulates the received signal into coded data, and then transmits the coded data to the error correction processing means 23.

The soft decision information generating means 22*a* generates the soft decision information indicating the current situation of the transmission line, based on the coded data which are demodulated by the demodulation processing means 22.

The error correction processing means 23 decodes the coded data which are demodulated by the demodulation processing means 22 to output the audio code, and also outputs the interpolation process information as for the coded data if it is decided that the uncorrectable error is added to the coded data.

The error correction processing situation analyzing means 24 analyzes the error added situation in the audio code which is output from the error correction processing means 23.

The optimization audio decoding processing means 25 selects the optimum audio decoding means 63, 65, or 66 out of the normal process type audio decoding means 63, the optimization process type audio decoding means 65, and the interpolation process type audio decoding means 66 based on the analyzed result obtained by the error correction processing situation analyzing means 24, and then outputs the audio data which are decoded by the selected audio decoding means 63, 65, or 66.

The audio output processing means 26 outputs the audio data which are output from the optimization audio decoding processing means 25.

Then, an operation of the demodulation processing means 22 in the audio decoding device 2 shown in FIG. 4 will be explained hereunder.

When the received signal demodulation processing means 32 receives the received signal from the reception processing means 21 via the received signal inputting means 31, such received signal demodulation processing means 32 in the demodulation processing means 22 shown in FIG. 4 demodulates the received signal to generate the coded data, and then transmits the coded data to the coded data outputting means 33.

The soft decision information generation data extracting means 34 in the soft decision information generating means 22*a* extracts the receiving electric field strength from the coded data which are generated by the received signal demodulation processing means 32 and also extracts the phase information of the symbol points from the coded data, and then transmits the extracted receiving electric field strength and the extracted phase information to the soft decision information calculation processing means 35.

Also, the soft decision information calculation processing means 35 extracts the receiving electric field strength and the phase information at the symbol points from the coded data which are demodulated by the received signal demodulation processing means 32, and then generates the soft decision information indicating the current situation of the transmission line while using a level of the receiving electric field strength, the phase shift at the symbol points, etc. as the parameters. For example, if the level of the receiving electric field strength is low, if the level of the receiving electric field strength is varied, if the amount of the phase shift of the symbol points is increased, or the like, the soft decision information calculation processing means 35 generates the soft decision information indicating that the situation of the transmission line becomes worse.

The soft decision information calculation processing means 35 generates the soft decision information indicating the current situation of the transmission line based on the receiving electric field strength and the phase information, and outputs the soft decision information via the soft decision information outputting means 36.

In this manner, since the receiving electric field strength and the phase information at the symbol points can be extracted from the coded data and then the soft decision information indicating the current situation of the transmission line can be generated based on the receiving electric field strength and the phase information, the soft decision information generating means 22a can cope sufficiently with the signal error which is generated due to the aggravating circumstances of the transmission line.

Next, an operation of the error correction processing means 23 in the audio decoding device 2 shown in FIG. 5 will be explained hereunder.

If the error correction demodulation processing means 43 in the error correction processing means 23 shown in FIG. 5 receives the coded data from the coded data outputting means 33 in the demodulation processing means 22 via the coded data inputting means 41 and also the soft decision information from the soft decision information outputting means 36 in the demodulation processing means 22 via the soft decision information inputting means 42, such error correction demodulation processing means 43 applies the error correction process to the coded data, which are input from the coded data inputting means 41, bit by bit based on the soft decision information, then decodes the coded data which are subjected to the error correction process to output the audio code, and then transmits the audio code to the optimization audio decoding processing means 25 via the audio code outputting means 44.

The error check bit calculating means 45 checks whether or not the error is added to the audio code which is input from the error correction demodulation processing means 43, and then transmitting the checked result to the error correction processing situation analyzing means 24 as the error check bit via the error check bit outputting means 46.

In this fashion, since the error correction process is applied to the coded data, which are demodulated by the demodulation processing means 22, bit by bit based on the soft decision information before the process advances to the optimization audio decoding processing means 25, the error correction demodulation processing means 43 can reduce the frequency of the interpolation process in the optimization audio decoding processing means 25.

Since it is possible to output the error check bit indicating the checked result to show whether or not the error is added to the audio code, the error check bit calculating means 45 can improve a processing efficiency in the succeeding error correction processing situation analyzing means 24 which analyzes the error added situation.

Next, an operation of the error correction processing situation analyzing means 24 in the audio decoding device 2 shown in FIG. 6 will be explained hereunder.

If the audio code error deciding means 52 in the error correction processing situation analyzing means 24 shown in FIG. 6 receives the error check bit from the error check bit outputting means 46 via the error check bit inputting means 51, such audio code error deciding means 52 decides whether or not the error is added to the audio code which is output from the error correction processing means 23, based on the error check bit.

Also, if the audio code error deciding means 52 decides that the error is not added to the audio code, it transmits a selection instruction to select the normal process type audio decoding means 63 in the optimization audio decoding processing means 25 to the optimization audio decoding processing means 25.

If the audio code error deciding means 52 decides that the error is added to the audio code, the error correctability deciding means 54 decides whether or not the error being added to the audio code is correctable, based on contents of the audio decoding process of the audio decoding means 63, 65, or 66 which is selected by the preceding frame stored in a audio decoding process storage buffer 53.

If the error correctability deciding means 54 decides that the error being added to the audio code is uncorrectable, it transmits a selection instruction to select the interpolation process type audio decoding means 66 in the optimization audio decoding processing means 25 to the optimization audio decoding processing means 25.

If the error correctability deciding means 54 decides that the error being added to the audio code is correctable, it transmits a selection instruction to select the optimization process type audio decoding means 65 in the optimization audio decoding processing means 25 to the optimization audio decoding processing means 25.

In this way, the audio code error deciding means 52 can decide whether or not the error is added to the audio code being output from the error correction processing means 23, based on the error check bit supplied from the error check bit calculating means 45.

Further, since the audio code error deciding means 52 selects the normal process type audio decoding means 63 to execute the normal audio decoding process if it decides that the error is not added to the audio code, the optimum audio decoding process to correspond to the current error added situation can be provided.

The error correctability deciding means 54 can decides whether or not the error being added to the audio code is correctable, based on the contents of the audio decoding process associated with the optimum audio decoding means 63, 65, 66 which is selected by the preceding frame stored in the audio decoding process storage buffer 53.

In addition, since the error correctability deciding means 54 can select the interpolation process type audio decoding means 66 to execute the audio decoding process together with the interpolation process if it decides that the error being added to the audio code is uncorrectable, the optimum audio decoding process to correspond to the current error added situation can be provided.

Further, since the error correctability deciding means 54 can select the optimization process type audio decoding means 65 to execute the audio decoding process together with the optimization process if it decides that the error being added to the audio code is correctable, the optimum audio decoding process to correspond to the current error added situation can be provided.

Next, an operation of the optimization audio decoding processing means 25 in the audio decoding device 2 shown in FIG. 7 will be explained hereunder.

The audio code inputting means 61 in the optimization audio decoding processing means 25 shown in FIG. 7 inputs the audio code from the audio code outputting means 44 in the error correction processing means 23.

If it is decided by the audio code error deciding means 52 that no error is added to the audio code, the normal process type audio decoding means 63 starts it operation. That is, the normal process type audio decoding means 63 decodes the audio code, which is input from the audio code inputting means 61, to generate the audio data, and then transmits the audio data to the audio output processing means 26 via the audio data outputting means 69.

If it is decided by the error correctability deciding means 54 that the error being added to the audio code is uncorrectable, the interpolation process type audio decoding means 66 starts its operation. That is, the interpolation process type audio decoding means 66 reads the audio data and the audio code, which are concerned with the preceding frame stored in the audio information storage buffer 64, as the interpolation information based on the interpolation process relating to the audio code which is input from the audio code inputting means 61, then applies the interpolation process to the audio code, to which the uncorrectable error is added, in unit of bit based on the interpolation information and the soft decision information which is input from the soft decision information inputting means 62, then decodes the audio code which is subjected to the interpolation process to generate the audio data, and then transmits the audio data to the audio output processing means 26 via the audio data outputting means 69.

If it is decided by the error correctability deciding means 54 that the error being added to the audio code is correctable, the optimization process type audio decoding means 65 starts its operation. That is, the optimization process type audio decoding means 65 applies the optimization process to the audio code, which is input from the audio code inputting means 61, based on the interpolation information and the soft decision information, then decodes the audio code which is subjected to the optimization process to generate the audio data, and then transmits the audio data to the audio output processing means 26 via the audio data outputting means 69.

If the audio data are generated by the normal process type audio decoding means 63, the optimization process type audio decoding means 65, or the interpolation process type audio decoding means 66, the audio decoding process storing means 67 stores sequentially contents of the audio decoding process, which are concerned with the selected audio decoding means 63, 65, 66, into the audio decoding process storage buffer 53 every frame of the audio data.

If the audio data which are generated by the normal process type audio decoding means 63, the optimization process type audio decoding means 65, or the interpolation process type audio decoding means 66, the audio information storing means 68 also stores sequentially the audio data and the audio code into the audio information storage buffer 64.

In this fashion, since the contents of the audio decoding process which is concerned with the selected audio decoding means 63, 65, 66 every frame of the audio data are stored sequentially into the audio decoding process storage buffer 53 when the audio data which is generated by the selected audio decoding means 63, 65, 66 in the optimization audio decoding processing means 25 are output, the audio decoding process storing means 67 can recognize by which audio decoding means 63, 65, 66 the audio decoding process is applied frame by frame, and also can use effectively the contents of the audio decoding process in every frame in the succeeding interpolation process.

Since the audio data and the audio code are stored sequentially into the audio information storage buffer 64 every frame when the audio data generated by the selected audio decoding means 63, 65, 66 are output, the audio information storing means 68 can recognize the audio data and the audio code frame by frame and also can use effectively the audio data and the audio code in every frame in the succeeding interpolation process.

Next, an operation of the optimization process type audio decoding means 65 shown in FIG. 8 will be explained hereunder.

The optimizing normal process type audio decoding means 71 in the optimization process type audio decoding means 65 shown in FIG. 8 starts its operation, and thus decodes the audio code to generate the audio data if it is decided by the error correctability deciding means 54 in the error correction processing situation analyzing means 24 that the error which is added to the audio code is correctable.

The audio decision processing means 72 calculates the correlation value between the audio data generated by the optimizing normal process type audio decoding means 71 and the audio data in the preceding frame stored in the audio information storage buffer 64, then decides whether or not the calculated correlation value is in excess of a threshold value, then decides the audio data as the audio if the calculated correlation value exceeds the threshold value, then sets the audio data generated by the optimizing normal process type audio decoding means 71 as the audio data generated in the optimization process type audio decoding means 65, and then transmits the audio data to the audio data outputting means 69.

Also, the interpolation process deciding means 73 counts sequentially the number of times of the audio decoding process frame by frame by using the optimizing normal process type audio decoding means 71, decides that the audio data is not the audio if it is decided by the audio decision processing means 72 that the correlation value is not in excess of the threshold value, and then decides whether or not the number of times of the audio decoding process exceeds a predetermined number of times.

If it is decided that the number of times of the audio decoding process in the optimizing normal process type audio decoding means 71 exceeds a predetermined number of times, the interpolation process deciding means 73 starts an operation of the optimizing interpolation process type audio decoding means 74 to carry out the interpolation process.

The optimizing interpolation process type audio decoding means 74 applies the interpolation process to the audio code from the audio code inputting means 61 bit by bit based on the soft decision information from the soft decision information inputting means 62 and the audio code relating to the preceding frame which is stored in the audio information storage buffer 64, then decodes the audio code which is subjected to the interpolation process to generate the audio data, then sets such audio data as the audio data generated in the optimization process type audio decoding means 65, and then transmits the audio data to the audio data outputting means 69.

If it is decided that the number of times of the audio decoding process in the optimizing normal process type audio decoding means 71 does not exceed a predetermined number of times, the interpolation process deciding means 73 does not execute the interpolation process but starts an operation of the audio code optimization processing means 75 so as to estimate further audio code.

In response to such start of the operation, the audio code optimization processing means 75 detects likelihood of respective elements of the audio code supplied from the audio code inputting means 61 based on the soft decision information, then applies the bit inversion to the low likelihood elements of the audio code, and then transmits the audio code which is subjected to the bit inversion again to the optimizing normal process type audio decoding means 71.

Then, the optimizing normal process type audio decoding means 71 codes the audio code which is subjected to the bit inversion to generate the audio data, and then transmits the audio data to the audio decision processing means 72.

If it is decided by the audio decision processing means 72 that the correlation value does not exceed the threshold value, the interpolation process deciding means 73 decides that the audio data is not the audio, then decides that the number of times of the audio decoding process exceeds the predetermined number of times, and then shifts the process to the audio decoding process in the optimizing interpolation process type audio decoding means 74 if it is decided that the number of times of the audio decoding process exceeds the predetermined number of times. Therefore, prior to the audio decoding process in the optimizing interpolation process type audio decoding means 74, the audio codes can be estimated as much as possible and also the interpolation process executed by the optimizing interpolation process type audio decoding means 74 is applied only to the audio codes which cannot be estimated, so that the frequency of the interpolation process can be reduced as small as possible and thus generation of the distortion and disconnection of the audio can be suppressed to the minimum while maintaining continuity of the audio waveform.

If it is decided by the interpolation process deciding means 73 that the number of times of the audio decoding process in every frame does not exceed the predetermined number of times, the audio code optimization processing means 75 detects likelihood of respective elements of the audio code being output by the error correction processing means 23 based on the soft decision information, then applies the bit inversion to the low likelihood elements of the audio code, and then decodes the audio code which is subjected to the bit inversion by the optimizing normal process type audio decoding means 71. Therefore, prior to the audio decoding process in the optimizing interpolation process type audio decoding means 74, the audio codes can be estimated as much as possible and also the interpolation process executed by the optimizing interpolation process type audio decoding means 74 is applied only to the audio codes which cannot be estimated, so that the frequency of the interpolation process can be reduced as small as possible and thus generation of the distortion and disconnection of the audio can be suppressed to the minimum while maintaining continuity of the audio waveform.

According to the second embodiment, there is provided the soft decision information generating means 22a which generates the soft decision information indicating the current situation of the transmission line, based on the coded data being demodulated by the demodulation processing means 22. If the audio code which is concerned with the coded data containing the uncorrectable error is received from the error correction processing means 23, the interpolation process can be applied to the audio code which is output from the error correction processing means 23 in unit of bit based on the interpolation information and the soft decision information, and then the audio code which is subjected to the interpolation process can be decoded to generate the audio data. As a result, while maintaining continuity of a audio waveform in the audio data after the decoding has been completed, generation of distortion and disconnection of the audio can be suppressed to the minimum by providing the optimum interpolation process which can mate with the current situation of the transmission line.

Also, according to the second embodiment, the optimum audio decoding means 63, 65, 66 out of the normal process type audio decoding means 63, the interpolation process type audio decoding means 66, and the optimization process type audio decoding means 65 in the optimization audio decoding processing means 25 can be selected based on the analyzed result by the error correction processing situation analyzing means 24 which analyzes the error added situation in the audio code which is output from the error correction processing means 23. As a result, the optimum audio decoding process which corresponds to the current error added situation can be provided.

According to the second embodiment, in the optimization process type audio decoding means 65, prior to the interpolation process in the optimizing normal process type audio decoding means 71, the audio code can be estimated based on the soft decision information as much as possible and the interpolation process can be applied only to the audio code which cannot be estimated. As a result, the frequency of the interpolation process can be reduced, the continuity of the audio waveform can be maintained, and generation of the distortion and disconnection of the audio can be suppressed to the minimum.

Figure 9:
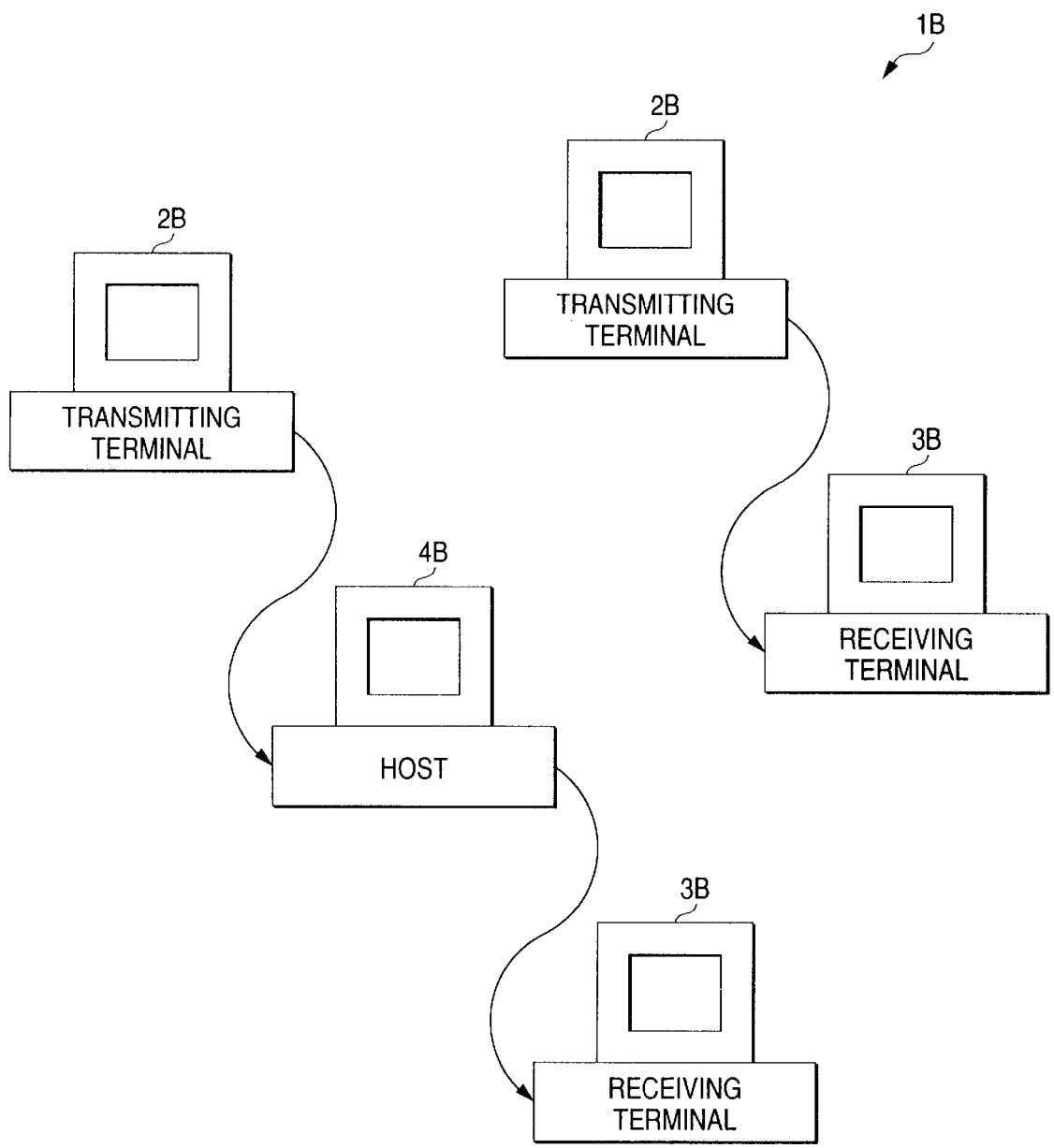
FIG. 9 is a block diagram showing a schematic configuration of a wire communication system to which the audio decoding device according to the first or second embodiment is applied.
Figure 10:
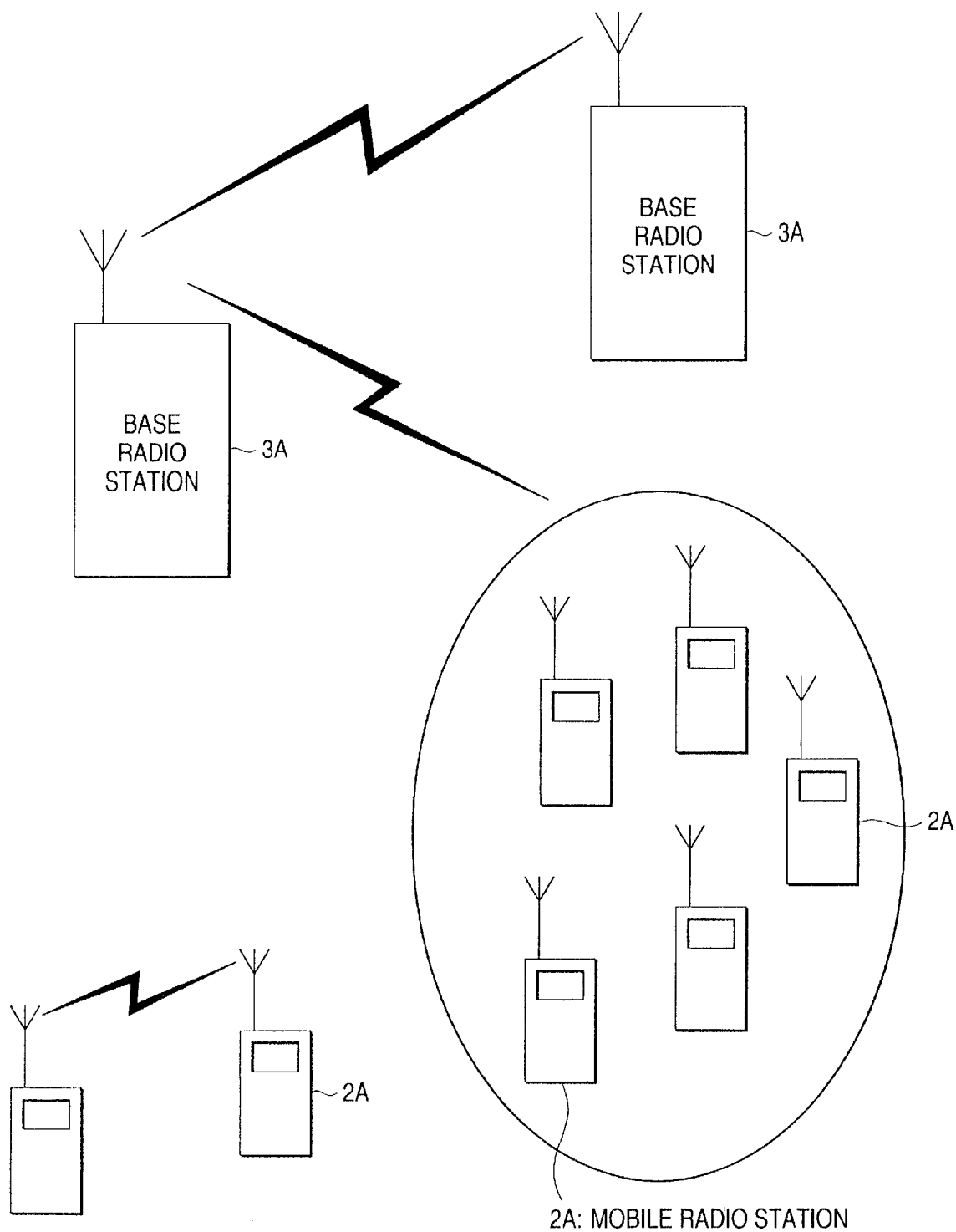
FIG. 10 is a block diagram showing a schematic configuration of a radio communication system to which the audio decoding device in the prior art is applied.
Figure 11:
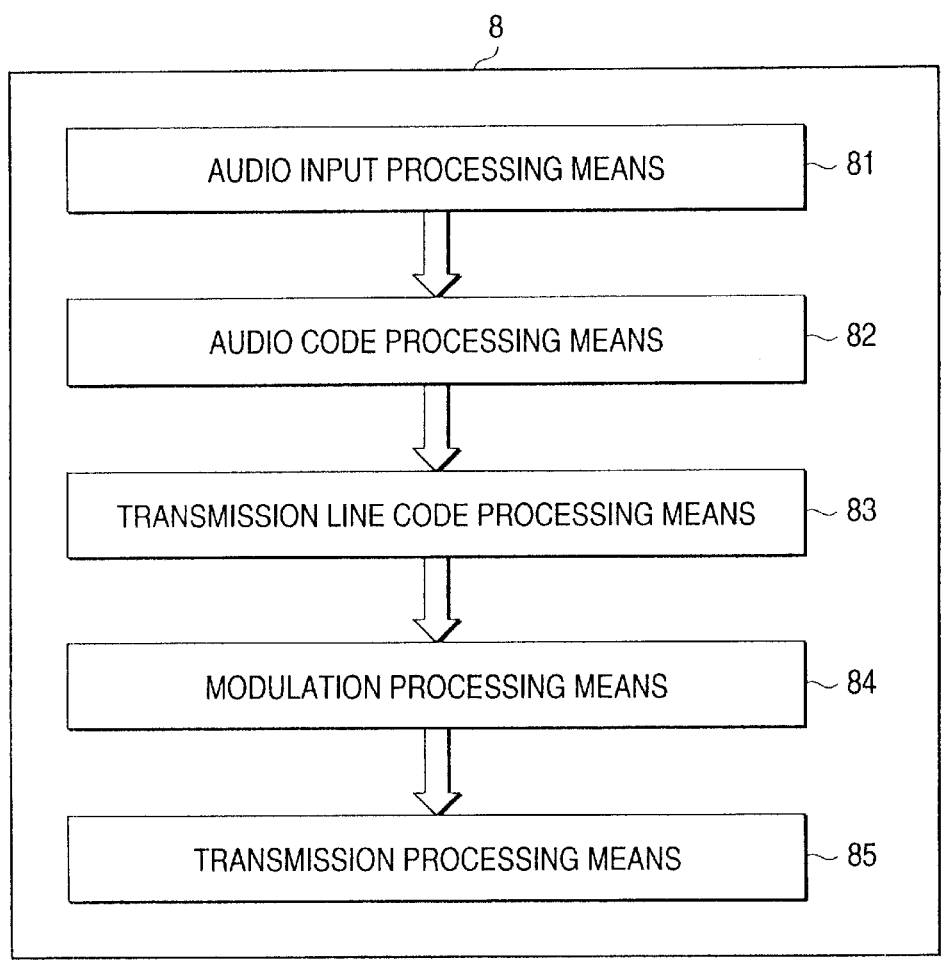
FIG. 11 is a block diagram showing a schematic configuration of an interior of a audio coding device which corresponds to the audio decoding device in the prior art.
Figure 12:
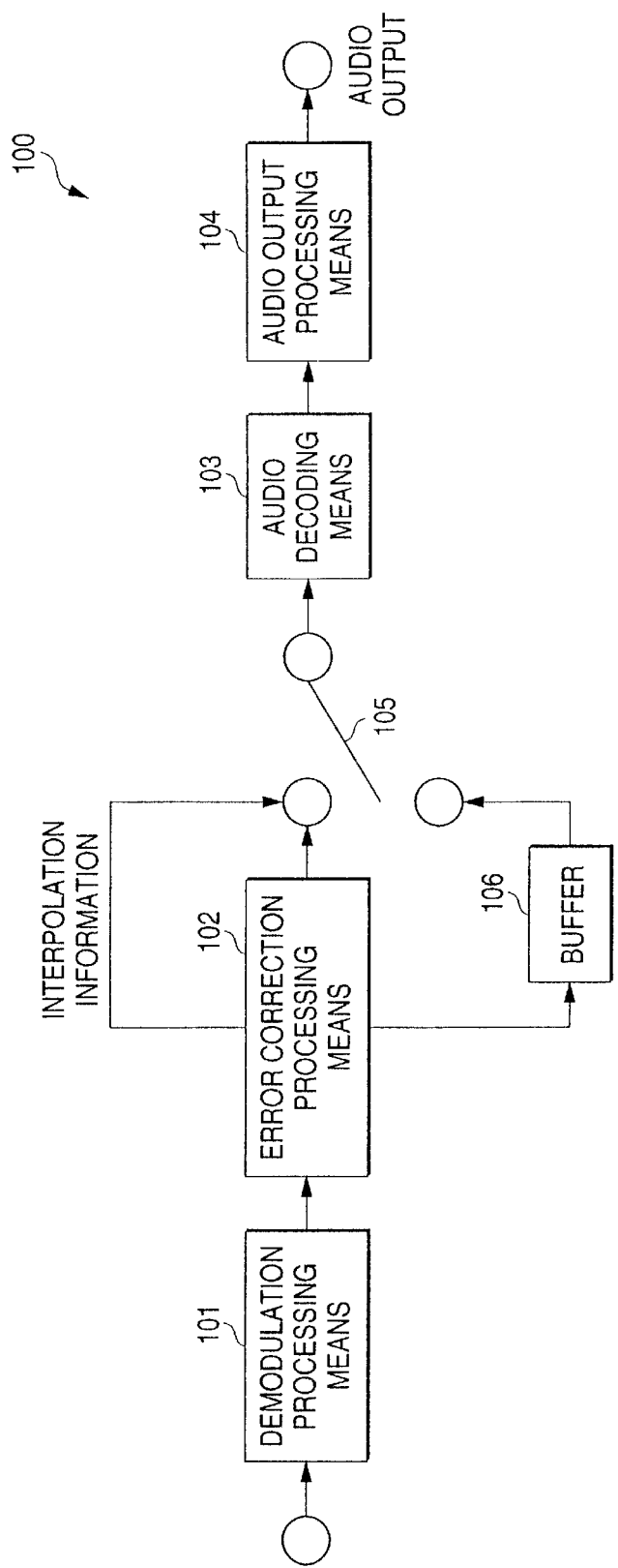
FIG. 12 is a block diagram showing a schematic configuration of an interior of the audio decoding device in the prior art.
Figure 13:
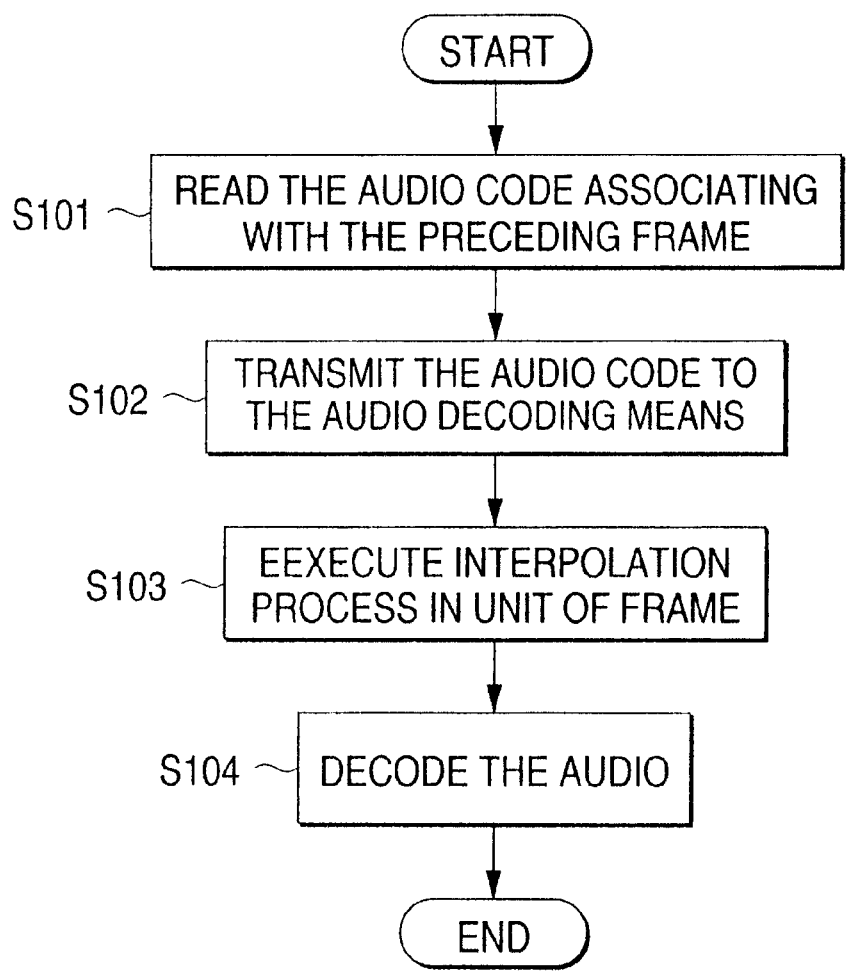
FIG. 13 is a flowchart showing a processing operation carried out in the interior of the audio decoding device in the prior art.

In this case, in the above embodiments, the audio decoding device 1 (2) is built in base radio stations 3A and mobile radio stations 2A in a radio communication system shown in FIG. 10 respectively. However, as shown in FIG. 9, the audio decoding device 1 (2) may be similarly applied to transmitting terminals 2B, receiving terminals 3B, and a host 4B.

According to the audio decoding device of the present invention constructed as above, while maintaining continuity of the audio waveform in the audio data after the decoding has been completed, generation of distortion and disconnection of the audio can be suppressed to the minimum by providing the optimum interpolation process which can mate with the current situation of the transmission line.

Also, according to the audio decoding device of the present invention, the optimum audio decoding process which can correspond to the current error added situation can be provided.

In addition, according to the audio decoding device of the present invention, prior to the interpolation process, the audio codes can be estimated based on the soft decision information as much as possible and also the interpolation process can be applied only to the audio codes which cannot be estimated, so that the frequency of the interpolation process can be reduced as small as possible and thus generation of the distortion and disconnection of the audio can be suppressed to the minimum while maintaining the continuity of the audio waveform.

What is claimed is:

1. A audio decoding device comprising:
reception processing means for receiving a signal from a transmission line as a received signal;
demodulation processing means for demodulating the received signal which is received by the reception processing means into coded data;
soft decision information generating means for generating a soft decision information indicating a current situation of the transmission line, based on coded data which are demodulated by the demodulation processing means;

error correction processing means for decoding the coded data to output a audio code and also outputting interpolation process information based on the coded data if it is decided that an uncorrectable error is added to the coded data which are demodulated by the demodulation processing means;

audio decoding processing means for reading interpolation information in a preceding frame based on interpolation process information concerning to the audio code, then applying an interpolation process to the audio code in unit of bit based on interpolation information and soft decision information, and then generating audio data by decoding the audio code which is subjected to the interpolation process if the audio code associated with the coded data, to which the uncorrectable error is added, is received from the error correction processing means; and audio output processing means for outputting the audio data generated by the audio decoding processing means.

2. A audio decoding device according to claim 1, wherein the error correction processing means stores/holds the audio code and the coded data frame by frame as the interpolation information when the coded data which are demodulated by the demodulation processing means and to which no error is added is decoded to output the audio code, or when an error correction process is applied to the coded data which are demodulated by the demodulation processing means and to which the correctable error is added and then the coded data which are subjected to the error correction process are decoded to output the audio code.

3. A audio decoding device according to claim 2, wherein the soft decision information generating means includes:

data extracting means for extracting a receiving electric field strength from the coded data which are demodulated by the demodulation processing means, and also extracting phase information of symbol points from the coded data, and soft decision information calculation processing means for generating soft decision information indicating the current situation of the transmission line, based on the receiving electric field strength and the phase information which are extracted by the data extracting means.

4. A audio decoding device according to claim 1, wherein the soft decision information generating means includes:

data extracting means for extracting a receiving electric field strength from the coded data which are demodulated by the demodulation processing means, and also extracting phase information of symbol points from the coded data, and soft decision information calculation processing means for generating soft decision information indicating the current situation of the transmission line, based on the receiving electric field strength and the phase information which are extracted by the data extracting means.

5. A audio decoding device comprising:

reception processing means for receiving a signal from a transmission line as a received signal;

demodulation processing means for demodulating the received signal which is received by the reception processing means into coded data;

soft decision information generating means for generating a soft decision information indicating a current situation of the transmission line, based on coded data which are demodulated by the demodulation processing means;

error correction processing means for decoding the coded data demodulated by the demodulation processing means to output a audio code and also outputting interpolation process information concerning to the coded data if it is decided that an uncorrectable error is added to the coded data;

error correction processing situation analyzing means for analyzing an error added situation of the audio code which is output from the error correction processing means;

optimization audio decoding processing means for selecting an optimum audio decoding means, based on an analyzed result obtained by the error correction processing situation analyzing means, out of a normal process type audio decoding means which decodes the audio code output from the error correction processing means to generate the audio data, an interpolation process type audio decoding means which applies the interpolation process to the audio code output from the error correction processing means in unit of bit based on the interpolation process information and the soft decision information and then decodes the audio code which is subjected to the interpolation process to generate the audio data, and an optimization process type audio decoding means which applies an optimizing process to the audio code output from the error correction processing means and then decodes the audio code which is subjected to the optimizing process to generate the audio data, and then outputting the audio data generated by a selected audio decoding means; and audio output processing means for outputting the audio data generated by the audio decoding processing means.

6. A audio decoding device according to claim 5, wherein the soft decision information generating means includes:

data extracting means for extracting a receiving electric field strength from the coded data which are demodulated by the demodulation processing means, and also extracting phase information of symbol points from the coded data, and soft decision information calculation processing means for generating soft decision information indicating the current situation of the transmission line, based on the receiving electric field strength and the phase information which are extracted by the data extracting means.

7. A audio decoding device according to claim 5, wherein the error correction processing means includes:

error correction demodulation processing means for applying the error correction process to the coded data which are demodulated by the demodulation processing means bit by bit based on the soft decision information which is generated by the soft decision information generating means, and then decoding the coded data which are subjected to the error correction process to output the audio code.

8. A audio decoding device according to claim 5, wherein the error correction processing means includes:

error check bit calculating means for checking whether or not the error is added to the audio code output from the error correction decoding processing means, and then outputting a checked result as an error check bit.

9. A audio decoding device according to claim 8, wherein the error correction processing situation analyzing means includes:
    audio code error deciding means for deciding whether or not the error is added to the audio code which is output from the error correction processing means, based on the error check bit supplied from error check bit calculating means.

10. A audio decoding device according to claim 9, wherein the error correction processing situation analyzing means includes:
    error correctability deciding means for deciding whether or not the error which is added to the audio code is correctable, based on contents of the audio decoding process associated with the audio decoding means which is selected by a preceding frame stored in a audio decoding process storage buffer, if it is decided by the audio code error deciding means that the error is added to the audio code.

11. A audio decoding device according to claim 10, wherein the optimization audio decoding processing means selects the interpolation process type audio decoding means if it is decided by an error correctability deciding means that the error which is added to the audio code is uncorrectable, and
    the selected interpolation process type audio decoding means reads the audio data and the audio code, which are stored in the audio information storage buffer and are concerned with the preceding frame, as the interpolation information based on the interpolation process information concerning to the audio code, then applies the interpolation process to the audio code to which the uncorrectable error is added in unit of bit based on the interpolation information and the soft decision information, and then decodes the audio code which is subjected to the interpolation process to generate the audio data, if the audio code which is output from the error correction processing means and to which the uncorrectable error is added is received.

12. A audio decoding device according to claim 10, wherein the optimization audio decoding processing means selects the optimization process type audio decoding means if it is decided by the error correctability deciding means that the error which is added to the audio code is correctable, and
    the selected optimization process type audio decoding means applies an optimizing process to the audio code which is output from the error correction processing means, and then decodes the audio code which is subjected to the optimizing process to generate the audio data.

13. A audio decoding device according to claim 10, wherein the optimization process type audio decoding means includes:
    optimizing normal process type audio decoding means for decoding the audio code to generate the audio data if it is decided by the error correctability deciding means that the error which is added to the audio code is correctable.

14. A audio decoding device according to claim 13, wherein the optimization process type audio decoding means includes:
    audio decision processing means for calculating a correlation value between the audio data generated by the optimizing normal process type audio decoding means and the audio data in the preceding frame stored in the audio information storage buffer, then deciding whether or not a calculated correlation value is in excess of a threshold value, and
    the optimization process type audio decoding means sets the audio data generated by the optimizing normal process type audio decoding means as the audio data generated in the optimization process type audio decoding means if it is decided by the audio decision processing means that the calculated correlation value exceeds the threshold value.

15. A audio decoding device according to claim 13, wherein the optimization process type audio decoding means includes:
    interpolation process deciding means for counting sequentially a number of times of the audio decoding process frame by frame by using the optimizing normal process type audio decoding means, and then deciding whether or not the number of times of the audio decoding process exceeds a predetermined number of times if it is decided by the audio decision processing means that the correlation value is not in excess of the threshold value, and
    optimizing interpolation process type audio decoding means for applying the interpolation process to the audio code being output from the error correction processing means bit by bit based on the soft decision information and the audio code concerning to the preceding frame which is stored in the audio information storage buffer, then decoding the audio code which is subjected to the interpolation process to generate the audio data, and then setting such audio data as the audio data generated in the optimization process type audio decoding means if it is decided by the interpolation process deciding means that the number of times of the audio decoding process in every frame exceeds the predetermined number of times.

16. A audio decoding device according to claim 9, wherein the optimization audio decoding processing means selects the normal process type audio decoding means if it is decided by the audio code error deciding means that no error is added to the audio code, and
    the selected normal process type audio decoding means decodes the audio code which is output from the error correction processing means to generate the audio data.

17. A audio decoding device according to claim 5, wherein the optimization audio decoding processing means includes:
    audio decoding process storing means for storing sequentially contents of the audio decoding process, which are concerned with a selected audio decoding means, into a audio decoding process storage buffer every frame of the audio data when the audio data which are generated by the selected audio decoding means are output.

18. A audio decoding device according to claim 5, wherein the optimization audio decoding processing means includes:
    audio information storage means for storing sequentially the audio data and the audio code into a audio information storage buffer every frame when the audio data which are generated by the selected audio decoding means are output.

19. A audio decoding device according to claim 5, wherein the optimization process type audio decoding means includes:

audio code optimization processing means for detecting likelihood of respective elements of the audio code which is output from the error correction processing means based on the soft decision information, then applying bit inversion to low likelihood elements of the audio code, and then generating the audio code which is subjected to the bit inversion, if it is decided by the interpolation process deciding means that the number of times of the audio decoding process in every frame does not exceed the predetermined number of times, and the optimizing normal process type audio decoding means decodes the audio code which is generated by the audio code optimization processing means and which is subjected to the bit inversion to generate the audio data.

* * * * *

UNITED STATES PATENT AND TRADEMARK OFFICE
CERTIFICATE OF CORRECTION

PATENT NO. : 6,751,586 B1  Page 1 of 1
DATED : June 15, 2004
INVENTOR(S) : Daisuke Okuno It is certified that error appears in the above-identified patent and that said Letters Patent is hereby corrected as shown below:

Column 15,
Line 33, after "the audio code; a audio code" please delete "37".

Signed and Sealed this

Twenty-first Day of September, 2004

JON W. DUDAS
*Director of the United States Patent and Trademark Office*